(12) United States Patent
Abe et al.

(10) Patent No.: US 9,604,141 B2
(45) Date of Patent: Mar. 28, 2017

(54) STORAGE MEDIUM HAVING GAME PROGRAM STORED THEREON, GAME APPARATUS, GAME SYSTEM, AND GAME PROCESSING METHOD

(75) Inventors: Goro Abe, Kyoto (JP); Makoto Yoshizawa, Sendai (JP); Norihiro Sugita, Sendai (JP); Tomoyuki Yambe, Sendai (JP); Chie Kawabe, Kyoto (JP)

(73) Assignees: NINTENDO CO., LTD., Kyoto (JP); TOHOKU UNIVERSITY, Sendai (JP)

( * ) Notice: Subject to any disclaimer, the term of this patent is extended or adjusted under 35 U.S.C. 154(b) by 1521 days.

(21) Appl. No.: 12/781,295

(22) Filed: May 17, 2010

(65) Prior Publication Data
US 2011/0195777 A1    Aug. 11, 2011

(30) Foreign Application Priority Data
Feb. 10, 2010    (JP) .................................. 2010-027970

(51) Int. Cl.
| | | |
|---|---|---|
| *A63F 9/24* | (2006.01) | |
| *A63F 13/426* | (2014.01) | |
| *A63F 13/211* | (2014.01) | |
| *A63F 13/837* | (2014.01) | |
| *A63F 13/212* | (2014.01) | |

(52) U.S. Cl.
CPC .......... *A63F 13/426* (2014.09); *A63F 13/211* (2014.09); *A63F 13/212* (2014.09); *A63F 13/837* (2014.09); *A63F 2300/105* (2013.01); *A63F 2300/1012* (2013.01); *A63F 2300/1087* (2013.01); *A63F 2300/6045* (2013.01); *A63F 2300/8076* (2013.01)

(58) Field of Classification Search
CPC ...... A63F 2300/8076; A63F 2300/1087; A63F 2300/6045
USPC ................................................ 434/19–23, 30
See application file for complete search history.

(56) References Cited

U.S. PATENT DOCUMENTS

| | | | | |
|---|---|---|---|---|
| 5,470,081 | A | 11/1995 | Sato et al. | |
| 5,672,107 | A * | 9/1997 | Clayman | 463/36 |
| 7,654,901 | B2 * | 2/2010 | Breving | 463/37 |
| 2007/0149282 | A1 * | 6/2007 | Lu et al. | 463/36 |
| 2008/0227546 | A1 * | 9/2008 | Roberts | 463/38 |

FOREIGN PATENT DOCUMENTS

| | | |
|---|---|---|
| JP | 4-336090 A | 11/1992 |
| JP | 6-296757 A | 10/1994 |
| JP | 7-181934 | 7/1995 |

OTHER PUBLICATIONS

User Manual for "Sniper Elite", 2005.*
(Continued)

*Primary Examiner* — Michael Grant
(74) *Attorney, Agent, or Firm* — Nixon & Vanderhye P.C.

(57) ABSTRACT

Operation input obtaining means obtains an operation input performed by a player with respect to an input device. Designated position setting means sets a designated position with respect to a virtual game world in accordance with the operation input. Biological signal obtaining means obtains a biological signal from the player. Designated position change means changes the designated position in accordance with the biological signal obtained by the biological signal obtaining means. Game processing means performs a predetermined game process on the basis of the designated position.

19 Claims, 17 Drawing Sheets

(56) References Cited

OTHER PUBLICATIONS

GameSpot review for "Sniper Elite", Nov. 2, 2005.*
Notice of Reasons for Rejection mailed Mar. 3, 2014 in Japanese Application No. 2010-027970, with English Translation (7 pages).

* cited by examiner

F I G. 2
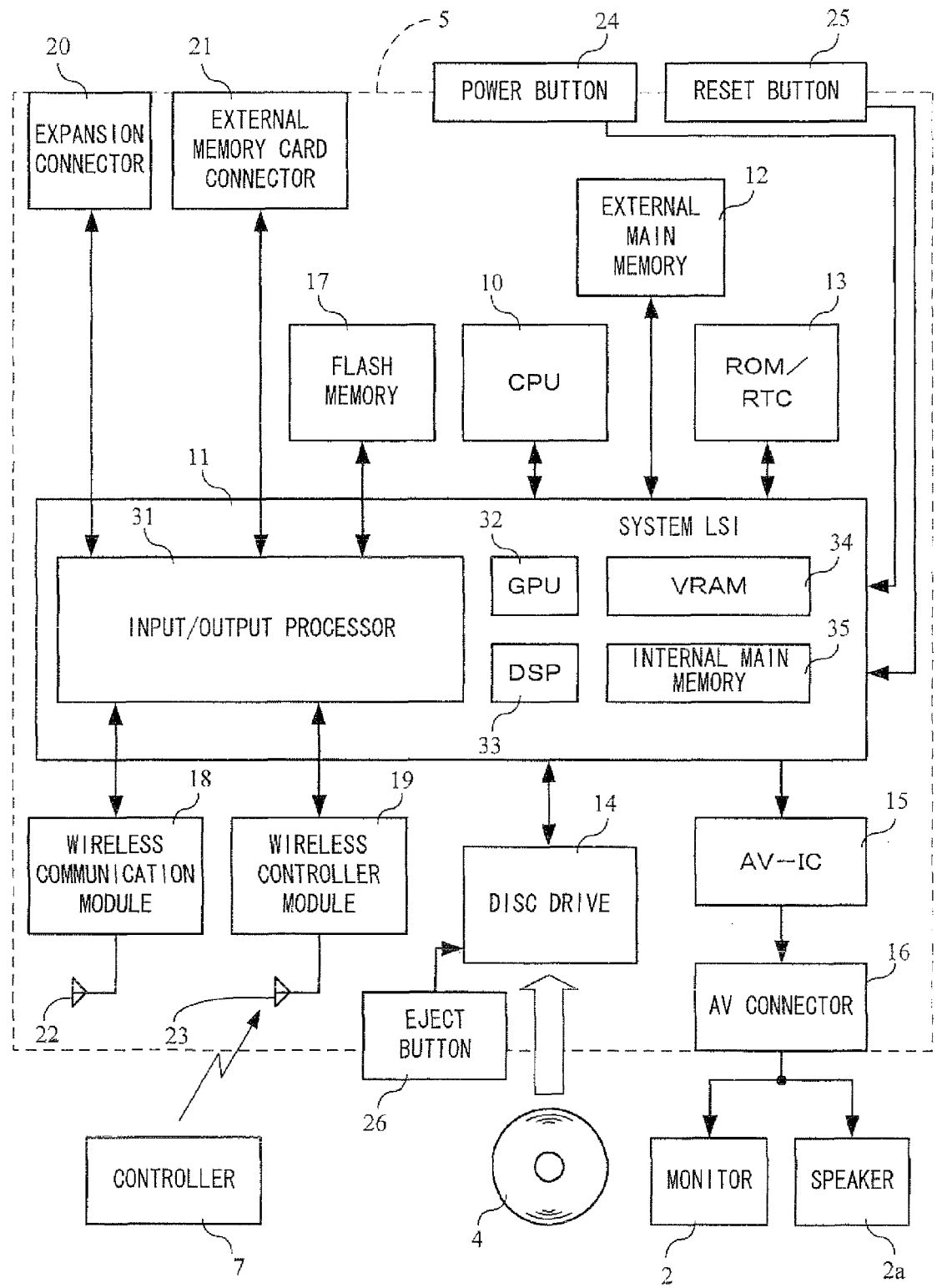

F I G. 3
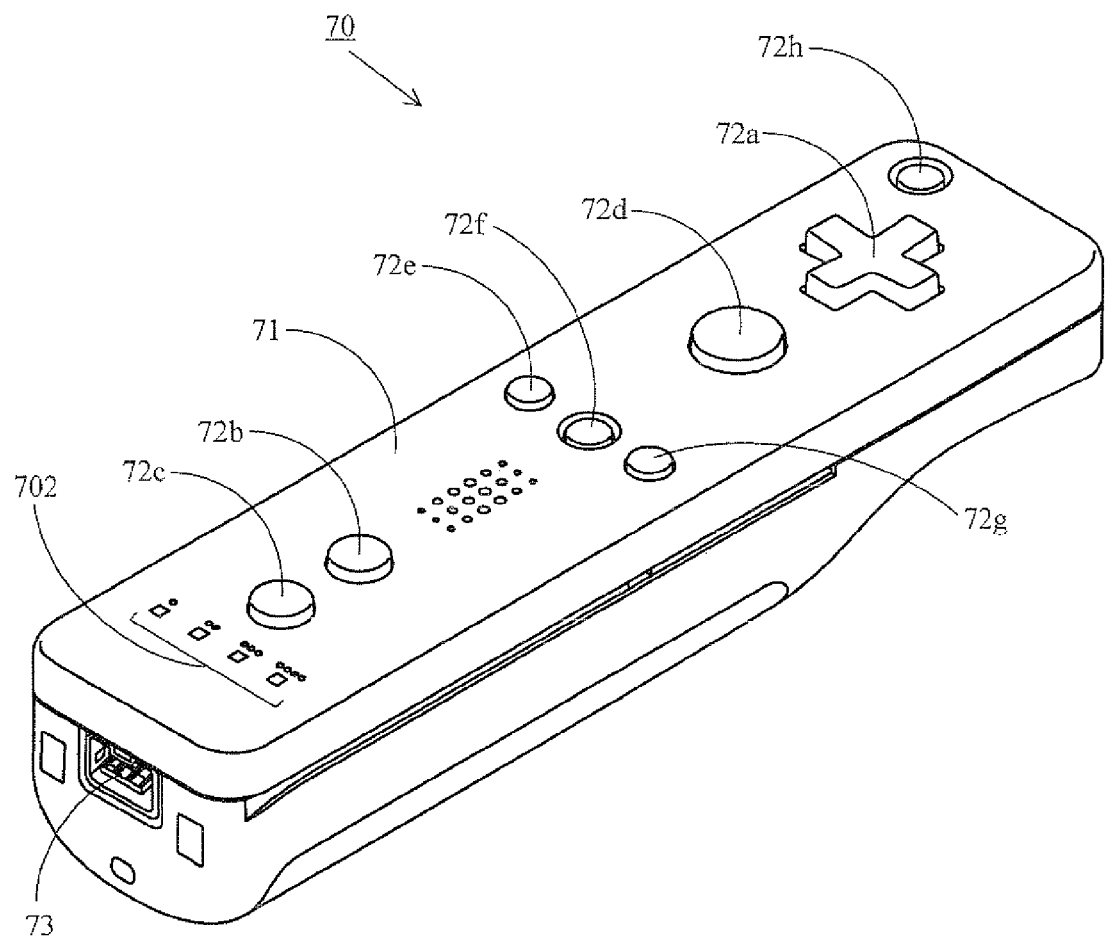

STORAGE MEDIUM HAVING GAME PROGRAM STORED THEREON, GAME APPARATUS, GAME SYSTEM, AND GAME PROCESSING METHOD

CROSS REFERENCE TO RELATED APPLICATION

The disclosure of Japanese Patent Application No. 2010-027970, filed Feb. 10, 2010, is incorporated herein by reference.

BACKGROUND AND SUMMARY

Field of the Invention

The technology presented herein relates to a storage medium having a game program stored thereon, a game apparatus, a game system, and a game processing method, and more particularly, to a storage medium having stored thereon a game program, a game apparatus, a game system, and a game processing method, which are capable of performing a predetermined game process on the basis of a position designated by a player.

Description of the Background Art

Conventionally, for example, as disclosed in Japanese Laid-Open Patent Publication No. H07-181934 (hereinafter referred to as Patent Document 1), a gun shooting game is known in which a target provided in a virtual game world is shot. In the gun shooting game, a target displayed on a display device is shot by using an input device for shooting (e.g., a gun-shaped input device with a gun-sight.

However, in the gun shooting game disclosed in Patent Document 1, a shooting direction is determined by a player performing an operation of changing the orientation of the input device for shooting, and a bullet is discharged in the determined shooting direction by performing an operation for shooting (e.g., by operating a trigger of the input device for shooting). Such an operation is a monotonous operation for the player, and lacks in fun.

Therefore, a feature of example embodiments presented herein is to provide a storage medium having a game program stored thereon, a game apparatus, a game system, and a game processing method, which realize a highly entertaining operation whose result cannot be easily anticipated by the player.

A first aspect of the present embodiment is a computer-readable storage medium having stored thereon a game program that is executed by a computer of a game apparatus that performs game processing on the basis of a designated position that is set in accordance with an operation performed by a player with respect to an input device. The game program causes the computer to operate as: operation input obtaining means; designated position setting means; biological signal obtaining means; designated position change means; and game processing means. The operation input obtaining means obtains an operation input performed by the player with respect to the input device. The designated position setting means sets a designated position with respect to a virtual game world in accordance with the operation input. The biological signal obtaining means obtains a biological signal from the player. The designated position change means changes the designated position in accordance with the biological signal obtained by the biological signal obtaining means. The game processing means performs a predetermined game process on the basis of the designated position.

According to the above, the designated position that is set in accordance with the operation performed by the player is determined in accordance with not only an operation of the player designating a position but also the biological signal of the player. Thus, a highly entertaining operation whose result cannot be easily anticipated by the player is possible.

Further, the game processing means may include shooting aim display means and discharge object discharge-display means. The shooting aim display means sets a shooting aim in accordance with the designated position, and displays the virtual game world in which the shooting aim is set, together with the shooting aim on a display device. The discharge object discharge-display means discharges a discharge object in accordance with the operation input, with a position in the virtual game world which corresponds to a position of the shooting aim, being a destination, and displays the virtual game world in which the discharged discharge object is arranged, on the display device.

According to the above, the position of the shooting aim that is a destination of the discharge object is determined in accordance with not only an operation of the player designating a position but also the biological signal of the player. Thus, a highly entertaining operation whose result cannot be easily anticipated by the player is possible.

Further, the shooting aim display means may change a position of the shooting aim displayed on a display screen of the display device, in accordance with the designated position change means changing the designated position, and may display the virtual game world in which the shooting aim is set, together with the shooting aim on the display device.

Further, the shooting aim display means may change a range of the virtual game world displayed on a display screen of the display device, in accordance with the designated position change means changing the designated position, and may display the virtual game world in which the shooting aim is set, together with the shooting aim on the display device.

According to the above, the position of the shooting aim and/or the range of the virtual game world, which are displayed on the display screen, are changed in accordance with the biological signal obtained from the player. Thus, a highly entertaining operation whose result cannot be easily anticipated by the player is possible.

Further, the designated position change means may temporarily change the designated position in accordance with the biological signal obtained by the biological signal obtaining means.

According to the above, the designated position that is set in accordance with the operation performed by the player is not only determined in accordance with an operation of the player designating a position but also temporarily changed on the basis of the biological signal of the player. Thus, a highly entertaining operation that temporarily becomes difficult to perform is possible.

Further, the biological signal obtaining means may obtain a cyclic biological signal from the player. Further, the designated position change means may change the designated position at every cycle of the cyclic biological signal.

According to the above, the designated position that is set in accordance with the operation performed by the player is not only determined in accordance with an operation of the player designating a position but also changed at every cycle on the basis of the biological signal of the player. Thus, a highly entertaining operation that cyclically becomes difficult to perform is possible.

Further, the designated position change means may start an operation for wobbling the designated position at every cycle of the cyclic biological signal, and may change the designated position such that a wobbling range of the designated position is reduced over time.

According to the above, the designated position that is set in accordance with the operation performed by the player is not only determined in accordance with an operation of the player designating a position but also changed so as to wobble at every cycle on the basis of the biological signal of the player. Thus, it is easily recognized that the biological signal of the player affects an operation.

Further, the game program may further cause the computer to operate as pulse timing detection means. The game program pulse timing detection means detects, on the basis of the cyclic biological signal obtained by the biological signal obtaining means, a pulse timing in pulse or heartbeat of the player. In this case, the designated position change means may change the designated position from the pulse timing detected by the pulse timing detection means.

According to the above, the designated position that is set in accordance with the operation performed by the player is not only determined in accordance with an operation of the player designating a position but also changed at every cycle of the pulse timing in the pulse or the heartbeat of the player. Thus, game processing is possible in which the pulse or the heartbeat of the player affects an operation.

Further, the biological signal obtaining means may obtain, as the cyclic biological signal, a signal relating to a pulse wave or the heartbeat of the player. In a first example, the pulse timing detection means may detect, as the pulse timing, a timing at which the signal relating to the pulse wave or the heartbeat, which signal is obtained by the biological signal obtaining means, represents a local minimum value or a local maximum value. In a second example, the pulse timing detection means may detect, as the pulse timing, a timing at which a contraction rate or an expansion rate of blood vessels reaches a maximum value in the signal relating to the pulse wave or the heartbeat, which signal is obtained by the biological signal obtaining means. In a third example, the pulse timing detection means may detect, as the pulse timing, a timing at which contraction acceleration or expansion acceleration of blood vessels reaches a maximum value in the signal relating to the pulse wave or the heartbeat, which signal is obtained by the biological signal obtaining means.

In any of the above examples, the pulse timing can be accurately detected by using the signal relating to the pulse or the heartbeat, which signal is obtained from the player.

Further, when ending an operation for temporarily changing the designated position, the designated position change means may change the designated position such that a designated position after the end of the operation becomes the designated position that is set by the designated position setting means.

According to the above, after the designated position is temporarily changed on the basis of the biological signal, the designated position returns to a position that is determined by only an operation of the player designating a position. Thus, after the temporary change, the operation of designating a position is possible without an uncomfortable feeling.

Further, when ending an operation for temporarily changing the designated position, the designated position setting means may set a designated position of the designated position setting means by using a designated position that is at a time when the designated position change means ends the operation.

According to the above, the designated position that is temporarily changed on the basis of the biological signal can be also caused to affect a later operation for determining a designated position.

Further, the game program may further cause the computer to operate as pulse timing detection means. The pulse timing detection means detects, on the basis of the biological signal obtained by the biological signal obtaining means, a pulse timing in pulse or heartbeat of the player. In this case, the designated position change means may temporarily change the designated position from the pulse timing detected by the pulse timing detection means to a time when a predetermined time period elapses.

According to the above, a highly entertaining operation that cannot be easily performed temporarily only for a predetermined time period from the pulse timing of the player, is possible.

Further, the designated position change means may set at least one of: a change amount by which the designated position is to be changed; and a period for which the designated position is to be changed, in accordance with the biological signal obtained by the biological signal obtaining means, and may change the designated position on the basis of at least one of the change amount and the period.

According to the above, the change amount by which the designated position is to be changed, and the period for which the designated position is to be changed, are set on the basis of the biological signal. Thus, a more highly entertaining operation whose result cannot be easily anticipated by the player is possible.

Further, the biological signal obtaining means may obtain, as the biological signal, at least one member that is selected from the group consisting of a pulse wave, a heartbeat, a sympathetic nerve activity, a parasympathetic nerve activity, a coefficient of variance of heartbeat, an interval of heartbeats, a respiratory cycle, an amplitude of the pulse wave, of the player. In this case, the designated position change means may set at least one of: the change amount by which the designated position is to be changed; and the period for which the designated position is to be changed, in accordance with the at least one member that is selected from the group and obtained by the biological signal obtaining means.

According to the above, the change amount by which the designated position is to be changed, and the period for which the designated position is to be changed, can be changed on the basis of the pulse wave, the heartbeat, the sympathetic nerve activity, the parasympathetic nerve activity, the coefficient of variance of heartbeat, the interval of heartbeats, the respiratory cycle, or the amplitude of the pulse wave, of the pulse wave.

Further, the designated position change means may set the change amount by which the designated position is to be changed, to be larger when an amplitude of a waveform of pulse or heartbeat of the player is greater, which waveform is calculated on the basis of the at least one member selected from the group.

According to the above, the change amount by which the designated position is to be changed is set on the basis of the amplitude of the waveform of the pulse or the heartbeat. Thus, a more highly entertaining operation whose result cannot be easily anticipated by the player is possible.

Further, second to fourth aspects of the present embodiment may be implemented in the form of a game apparatus or a game system including the above respective means, or in the form of a game processing method including operations performed by the above respective means.

According to the present embodiment, the designated position that is set in accordance with the operation performed by the player is determined in accordance with not only an operation of the player designating a position but also the biological signal of the player. Thus, a highly entertaining operation whose result cannot be easily anticipated by the player is possible.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 2 is a block diagram showing an example of a game apparatus body 5 of FIG. 1;

FIG. 3 is a perspective view of a core unit 70 of FIG. 1 as viewed from a top rear side thereof;

DESCRIPTION OF THE PREFERRED EMBODIMENTS

Figure 1:
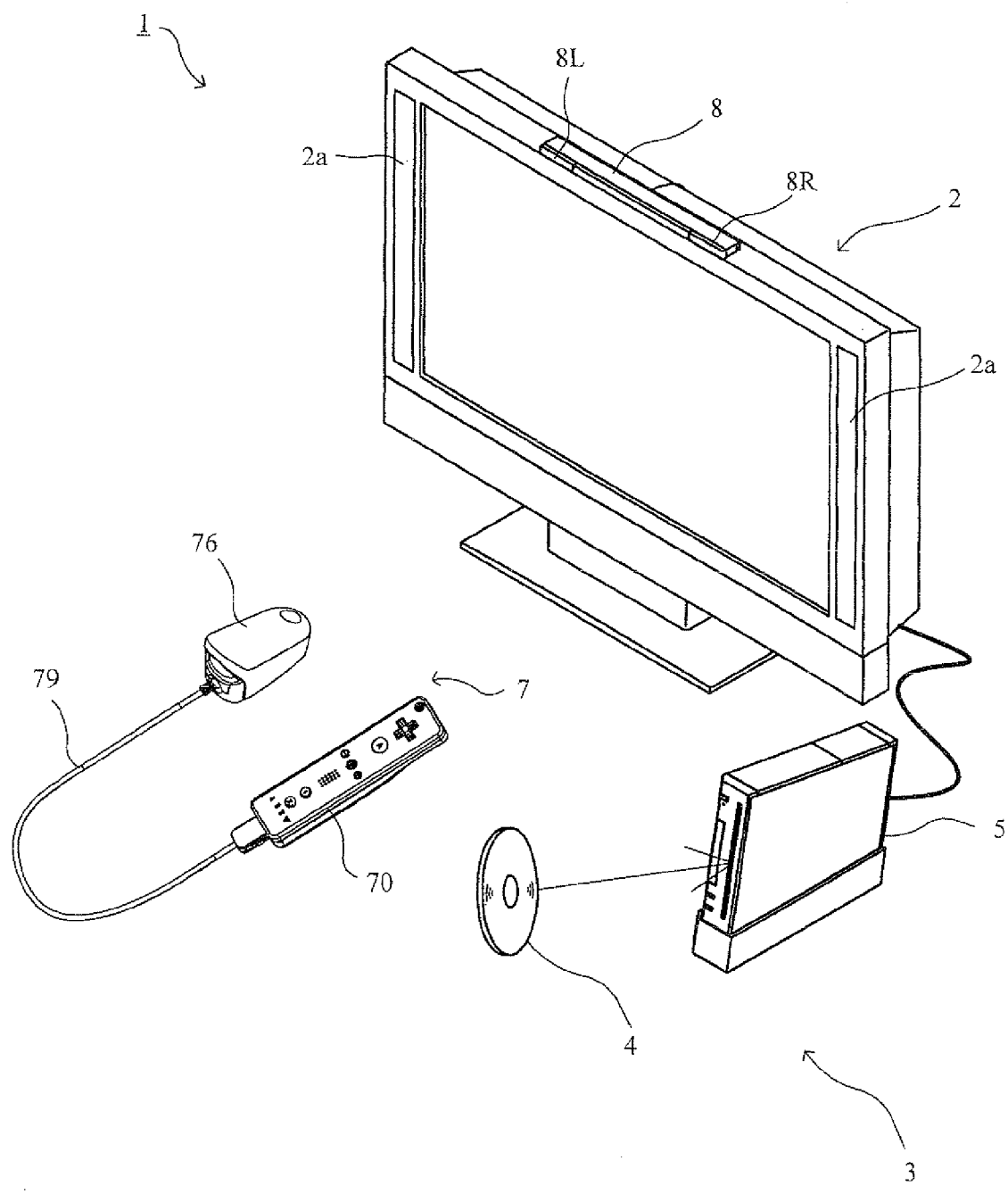
FIG. 1 is an external view showing an example of a game system 1 according to an embodiment.

With reference to FIG. 1, an apparatus for executing a game program according to one embodiment. Hereinafter, in order to give a specific explanation, a description will be given using a game system including a stationary game apparatus body 5 that is an example of the above apparatus. FIG. 1 is an external view showing an example of a game system 1 including a stationary game apparatus 3. FIG. 2 is a block diagram showing an example of the game apparatus body 5. The game system 1 will be described below.

As shown in FIG. 1, the game system 1 includes: a home-use television receiver 2 (hereinafter referred to as a monitor 2) that is an example of display means; and the stationary game apparatus 3 that is connected to the monitor 2 via a connection cord. The monitor 2 has loudspeakers 2a for outputting, in the form of sound, an audio signal outputted from the game apparatus 3. The game apparatus 3 includes: an optical disc 4 having the game program stored thereon; the game apparatus body 5 having a computer for executing the game program of the optical disc 4 to output and display a game screen on the monitor 2; and a controller 7 for providing the game apparatus body 5 with necessary operation information for a game in which a character or the like displayed in the game screen is controlled.

The game apparatus body 5 includes a wireless controller module 19 therein (see FIG. 2). The wireless controller module 19 receives data wirelessly transmitted from the controller 7, and transmits data from the game apparatus body 5 to the controller 7. In this manner, the controller 7 and the game apparatus body 5 are connected to each other by wireless communication. Further, the optical disc 4 as an example of an exchangeable information storage medium is detachably mounted on the game apparatus body 5.

On the game apparatus body 5, a flash memory 17 (see FIG. 2) is mounted. The flash memory 17 acts as a backup memory for fixedly storing such data as save data. The game apparatus body 5 executes the game program or the like stored in the optical disc 4, and displays a result thereof as a game image on the monitor 2. The game program to be executed may be prestored not only in the optical disc 4, but also in the flash memory 17. The game apparatus body 5 may reproduce a state of the game played in the past, by using the save data stored in the flash memory 17, and display an image of the reproduced game state on the monitor 2. A player of the game apparatus 3 can enjoy advancing in the game by operating the controller 7 while watching the game image displayed on the monitor 2.

By using the technology of, for example, Bluetooth (registered trademark), the controller 7 wirelessly transmits transmission data, such as operation information and biological information, to the game apparatus body 5 having the wireless controller module 19 therein. The controller 7 includes a core unit 70 and a vital sensor 76. The core unit 70 and the vital sensor 76 are connected to each other via a flexible connection cable 79. The core unit 70 is operation means mainly for controlling an object or the like displayed on a display screen of the monitor 2. The vital sensor 76 is attached to a player's body (e.g., to a player's finger). The vital sensor 76 obtains biological signals from the player, and sends biological information to the core unit 70 via the connection cable 79. The core unit 70 includes: a housing that is small enough to be held by one hand; and a plurality of operation buttons (including a cross key, a stick, or the like) that are exposed at a surface of the housing. As described later in detail, the core unit 70 includes an imaging information calculation section 74 for taking an image of a view viewed from the core unit 70. As an example of imaging targets of the imaging information calculation section 74, two LED modules 8L and 8R (hereinafter referred to as "markers 8L and 8R") are provided in the vicinity of the display screen of the monitor 2. These markers 8L and 8R each output, for example, infrared light forward from the monitor 2. The controller 7 (e.g., the core unit 70) is capable of receiving, via a communication section 75, transmission data wirelessly transmitted from the wireless controller module 19 of the game apparatus body 5, and generating a sound or vibration based on the transmission data.

Note that, in this embodiment, the core unit 70 and the vital sensor 76 are connected to each other via the flexible connection cable 79. However, the connection cable 79 can be eliminated by mounting a wireless unit on the vital sensor 76. For example, by mounting a Bluetooth (registered trademark) unit on the vital sensor 76 as a wireless unit, transmission of biological information from the vital sensor 76 to the care unit 70 or to the game apparatus body 5 is enabled. Further, the core unit 70 and the vital sensor 76 may be integrated, by fixedly providing the vital sensor 76 on the core unit 70. In this case, the player can use the vital sensor 76 integrated with the core unit 70.

Next, an internal configuration of the game apparatus body 5 will be described with reference to FIG. 2. FIG. 2 is a block diagram showing the internal configuration of the game apparatus body 5. The game apparatus body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as: controlling data transfer among components connected to the system LSI 11; generating an image to be displayed; obtaining data from external devices; and the like. An internal configuration of the system LSI 11 will be described later. The external main memory 12 that is a volatile memory stores a program, for example, the game program loaded from the optical disc 4, or a game program loaded from the flash memory 17, and also stores various data. The external main memory 12 is used as a work area or buffer area of the CPU 10. The ROM/RTC 13 has a ROM in which a boot program for the game apparatus body 5 is incorporated (so-called a boot ROM), and has a clock circuit (RTC) that counts the time. The disc drive 14 reads program data, texture data, and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34, and the internal main memory 35 are provided. Although not shown, these components 31 to 35 are connected to each other via an internal bus.

The GPU 32 is a part of rendering means, and generates an image in accordance with a graphics command from the CPU 10. The VRAM 34 stores necessary data for the GPU 32 to execute the graphics command (data such as polygon data, texture data and the like). At the time of generating the image, the GPU 32 uses the data stored in the VRAM 34, thereby generating image data.

The DSP 33 acts as an audio processor, and generates audio data by using sound data and sound waveform (tone) data stored in the internal main memory 35 and in the external main memory 12.

The image data and the audio data generated in the above manner are read by the AV-IC 15. The AV-IC 15 outputs the read image data to the monitor 2 via the AV connector 16, and outputs the read audio data to the loudspeakers 2a embedded in the monitor 2. As a result, an image is displayed on the monitor 2 and a sound is outputted from the loudspeakers 2a.

The input/output processor (I/O Processor) 31 performs, for example, data transmission/reception to/from components connected thereto, and data downloading from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to detect presence or absence of data that is required to be transmitted to the network. If such data is present, the data is transmitted to the network via the wireless communication module 18 and the antenna 22. Also, the input/output processor 31 receives, via the network, the antenna 22 and the wireless communication module 18, data transmitted from other game apparatuses or data downloaded from a download server, and stores the received data in the flash memory 17. By executing the game program, the CPU 10 reads the data stored in the flash memory 17, and the game program uses the read data. In addition to the data transmitted and received between the game apparatus body 5 and other game apparatuses or various servers, the flash memory 17 may store save data of a game that is played using the game apparatus body 5 (such as result data or progress data of the game).

Further, the input/output processor 31 receives, via the antenna 23 and the wireless controller module 19, operation data or the like transmitted from the controller 7, and stores (temporarily) the operation data or the like in a buffer area of the internal main memory 35 or of the external main memory 12. Note that, similarly to the external main memory 12, the internal main memory 35 may store a program, for example, the game program loaded from the optical disc 4 or a game program loaded from the flash memory 17, and also store various data. The internal main memory 35 may be used as a work area or buffer area of the CPU 10.

In addition, the expansion connector 20 and the external memory card connector 21 are connected to the input/output processor 31. The expansion connector 20 is a connector for such interface as USB, SCSI or the like. The expansion connector 20, instead of the wireless communication module 18, is able to perform communication with a network by being connected to such a medium as an external storage medium, to such a peripheral device as another controller, or to a connector for wired communication. The external memory card connector 21 is a connector to be connected to an external storage medium such as a memory card. For example, the input/output processor 31 is able to access the external storage medium via the expansion connector 20 or the external memory card connector 21 to store or read data from the external storage medium.

On the game apparatus body 5 (e.g., on a front main surface thereof), a power button 24 of the game apparatus body 5, a reset button 25 for resetting game processing, an insertion slot for mounting the optical disc 4 in a detachable manner, an eject button 26 for ejecting the optical disc 4 from the insertion slot of the game apparatus body 5, and the like, are provided. The power button 24 and the reset button 25 are connected to the system LSI 11. When the power button 24 is turned on, each component of the game apparatus body 5 is supplied with power via an AC adaptor (not shown). When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

Figure 4:
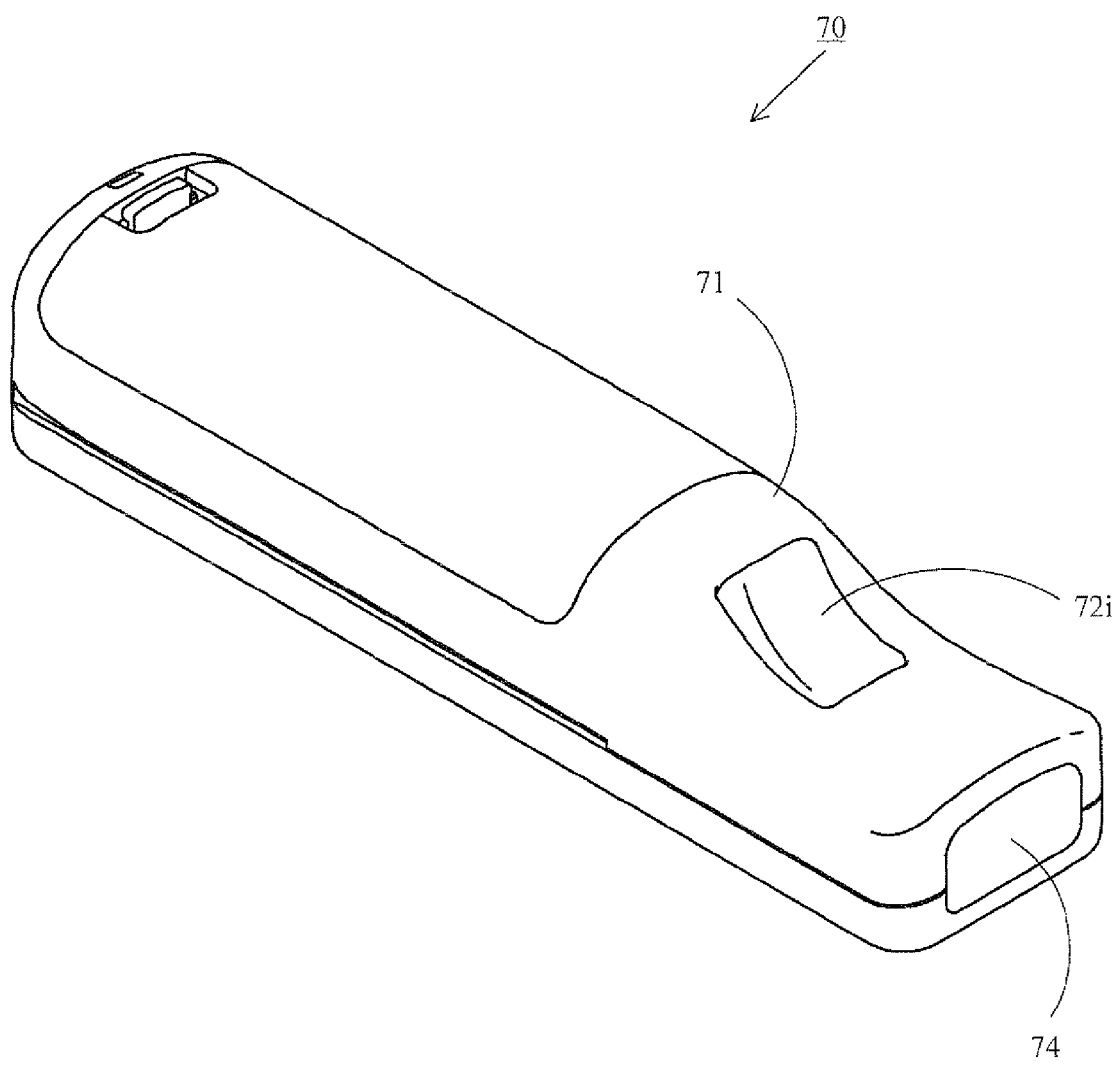
FIG. 4 is a perspective view of the core unit 70 of FIG. 3 as viewed from a bottom front side thereof.

With reference to FIGS. 3 and 4, the core unit 70 will be described. FIG. 3 is a perspective view of the core unit 70 viewed from a top rear side thereof. FIG. 4 is a perspective view of the core unit 70 viewed from a bottom front side thereof.

As shown in FIGS. 3 and 4, the core unit 70 includes a housing 71 formed by plastic molding or the like. The housing 71 has a plurality of operation sections 72 provided thereon. The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right, and left), which are respectively located on cross-shaped projecting portions arranged at intervals of 90 degrees. The player selects one of the front, rear, right and left directions by pressing one of the operation portions of the cross key 72a. Through an operation of the cross key 72a, the player can, for example, designate a direction in which a player character or the like appearing in a virtual game world is to move, or give an instruction to select one of multiple options.

The cross key 72a is an operation section for outputting an operation signal in accordance with the aforementioned direction input operation performed by the player. Such an operation section may be provided in a different form. For example, an operation section that has four push switches arranged in a cross formation and that is capable of outputting an operation signal in accordance with pressing of one of the push switches by the player, may be provided. Alternatively, an operation section that has a composite switch having, in addition to the above four push switches, a center switch provided at an intersection point of the above cross formation, may be provided. Still alternatively, the cross key 72a may be replaced with an operation section that includes an inclinable stick (so-called a joy stick) projecting from the top surface of the housing 71 and that outputs an operation signal in accordance with an inclining direction of the stick. Still alternatively, the cross key 72a may be replaced with an operation section that includes a horizontally-slidable disc-shaped member and that outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a 1st button, a 2nd button, and an A button are assigned to the operation buttons 72b to 72d. Also, functions as a minus button, a home button, and a plus button are assigned to the operation buttons 72e to 72g, for example. Operation functions are assigned to the respective operation buttons 72a to 72g in accordance with the game program executed by the game apparatus body 5. In the exemplary arrangement shown in FIG. 3, the operation buttons 72b to 72d are arranged in a line at the center on the top surface of the housing 71 in a front-rear direction. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the game apparatus body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (a number) is assigned to the core unit 70 such that the core unit 70 is distinguishable from other controllers. The LEDs 702 are used for, e.g., informing the player of the controller type currently set for the core unit 70. Specifically, a signal is transmitted from the wireless controller module 19 to the core unit 70 such that one of the plurality of LEDs 702, which corresponds to the controller type of the core unit 70, is lit up.

On the top surface of the housing 71, sound holes for outputting sounds from a later-described speaker (a speaker 706 shown in FIG. 5) to the external space are formed between the operation button 72b and the operation buttons 72e to 72g.

On the bottom surface of the housing 71, a recessed portion is formed. The recessed portion on the bottom surface of the housing 71 is formed in a position in which an index finger or middle finger of the player is located when the player holds the core unit 70 with one hand so as to point a front surface thereof to the markers 8L and 8R. On a slope surface of the recessed portion, an operation button 72i is provided. The operation button 72i is an operation section acting as, for example, a B button.

On the front surface of the housing 71, an image pickup element 743 that is a part of the imaging information calculation section 74 is provided. The imaging information calculation section 74 is a system for: analyzing image data of an image taken by the core unit 70; identifying an area having a high brightness in the image; and detecting the position of the center of gravity, the size, and the like of the area. The imaging information calculation section 74 has, for example, a maximum sampling period of approximately 200 frames/sec, and therefore can trace and analyze even a relatively fast motion of the core unit 70. A configuration of the imaging information calculation section 74 will be described later in detail. On the rear surface of the housing 71, a connector 73 is provided. The connector 73 is, for example, an edge connector, and is used for engaging and connecting the core unit 70 with a connection cable, for example.

Figure 5:
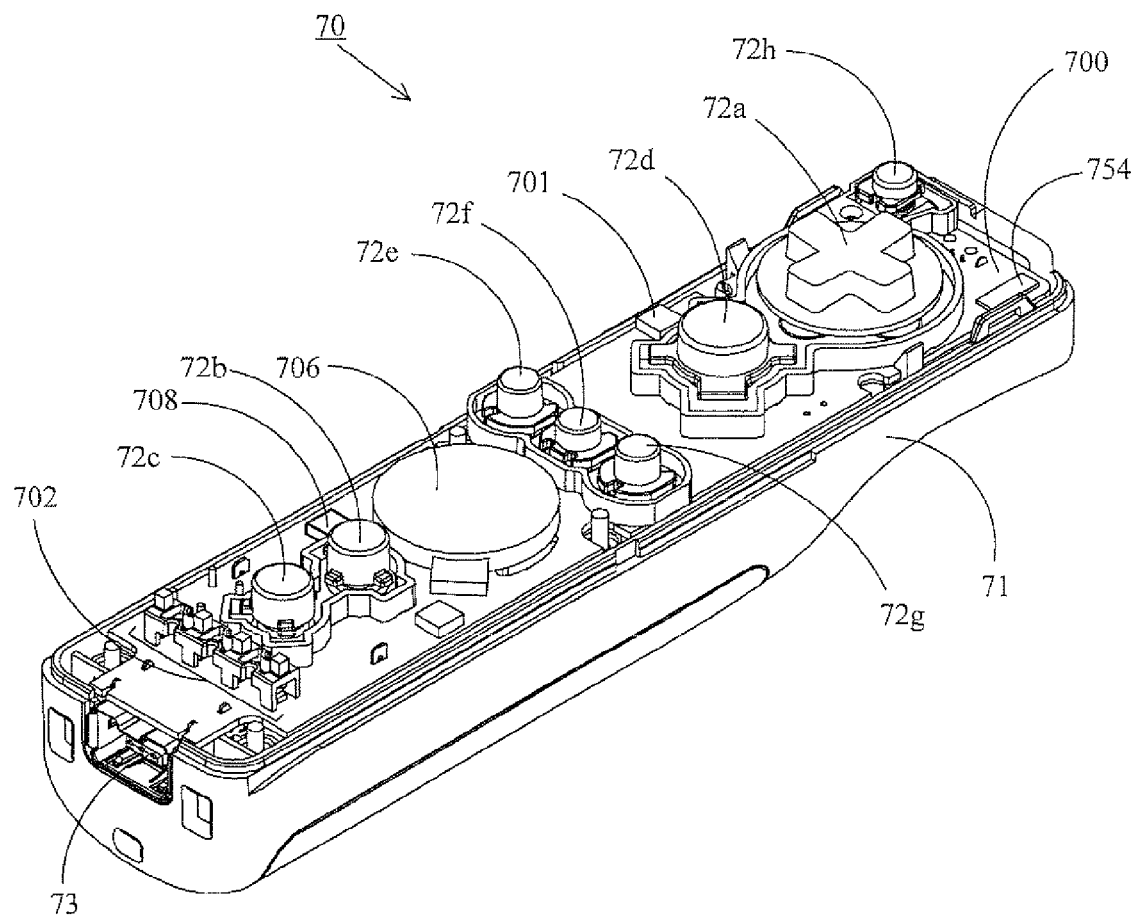
FIG. 5 is a perspective view illustrating an example of the core unit 70 of FIG. 3 in a state where an upper casing thereof is removed.
Figure 6:
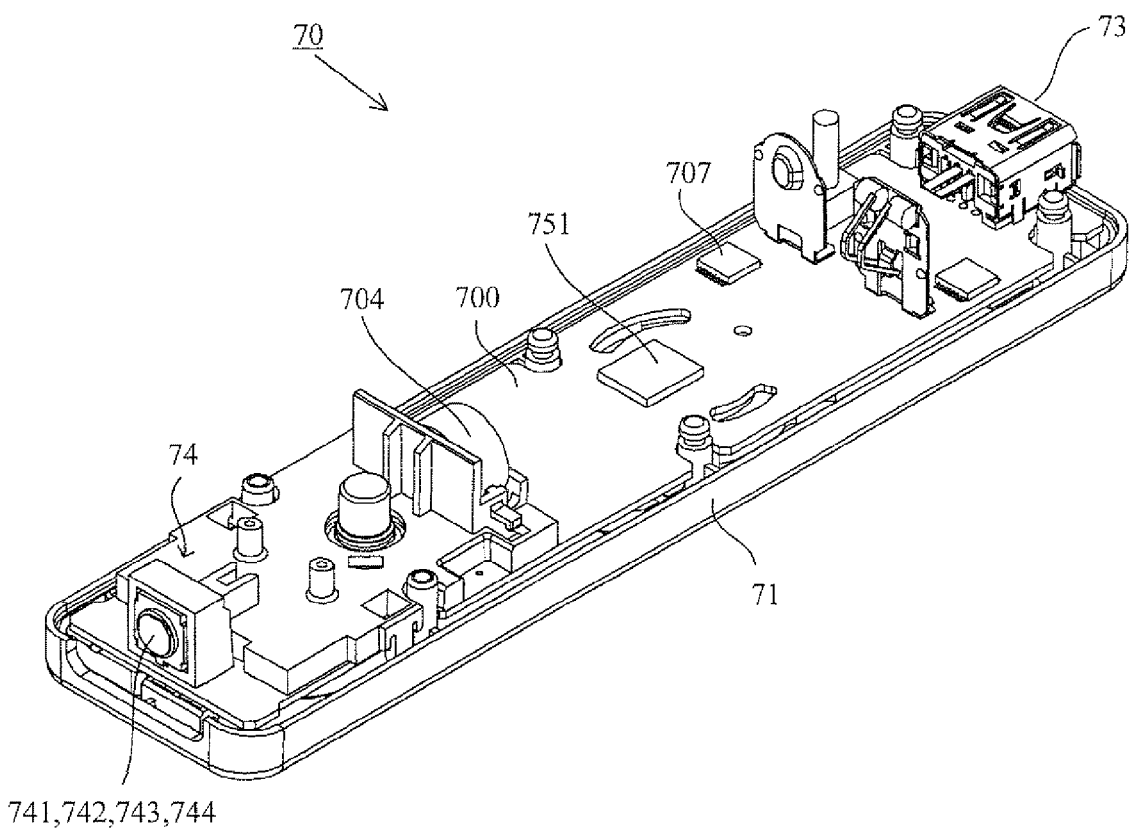
FIG. 6 is a perspective view illustrating an example of the core unit 70 of FIG. 4 in a state where a lower casing thereof is removed.

Next, an internal structure of the core unit 70 will be described with reference to FIGS. 5 and 6. FIG. 5 is a perspective view, viewed from a rear surface side of the core unit 70, of an example of the core unit 70 in a state where an upper casing thereof (a part of the housing 71) is removed. FIG. 6 is a perspective view, viewed from a front surface side of the core unit 70, of an example of the core unit 70 in a state where a lower casing thereof (a part of the housing 71) is removed. Here, FIG. 6 is a perspective view showing a reverse side of a substrate 700 shown in FIG. 5.

As shown in FIG. 5, the substrate 700 is fixedly provided inside the housing 71. On a top main surface of the substrate 700, the operation buttons 72*a* to 72*h*, an acceleration sensor 701, the LEDs 702, an antenna 754, and the like, are provided. These elements are connected to, for example, a microcomputer 751 (see FIGS. 6 and 7) via wiring (not shown) formed on the substrate 700 and the like. A wireless module 753 (see FIG. 7) and the antenna 754 allow the core unit 70 to act as a wireless controller. Inside the housing 71, a quartz oscillator (not shown) is provided, and the quartz oscillator generates a reference clock of the later-described microcomputer 751. Further, the speaker 706 and an amplifier 708 are provided on the top main surface of the substrate 700. The acceleration sensor 701 is provided, on the substrate 700, to the left side of the operation button 72*d* (i.e., provided not on a central part but on a peripheral part of the substrate 700). For this reason, in response to the core unit 70 having rotated around an axis of the longitudinal direction of the core unit 70, the acceleration sensor 701 is able to detect, in addition to a change in a direction of the gravitational acceleration, acceleration containing a centrifugal component, and the game apparatus body 5 or the like is able to determine, on the basis of detected acceleration data, a motion of the core unit 70 by predetermined calculation with favorable sensitivity.

As shown in FIG. 6, at a front edge of the bottom main surface of the substrate 700, the imaging information calculation section 74 is provided. The imaging information calculation section 74 includes an infrared filter 741, a lens 742, the image pickup element 743, and an image processing circuit 744, which are located in said order from the front surface of the core unit 70. These elements are attached to the bottom main surface of the substrate 700. At a rear edge of the bottom main surface of the substrate 700, the connector 73 is mounted. Further, a sound IC 707 and the microcomputer 751 are provided on the bottom main surface of the substrate 700. The sound IC 707 is connected to the microcomputer 751 and the amplifier 708 via wiring formed on the substrate 700 and the like, and outputs an audio signal via the amplifier 708 to the speaker 706 in response to sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via wiring formed on the substrate 700 and the like, and is activated or deactivated in accordance with vibration data transmitted from the game apparatus body 5. The core unit 70 is vibrated by actuation of the vibrator 704, and the vibration is conveyed to the player's hand holding the core unit 70. Thus, a so-called vibration-feedback game is realized. Since the vibrator 704 is provided at a relatively forward position in the housing 71, the housing 71 held by the player significantly vibrates, and allows the player to easily feel the vibration.

Figure 7:
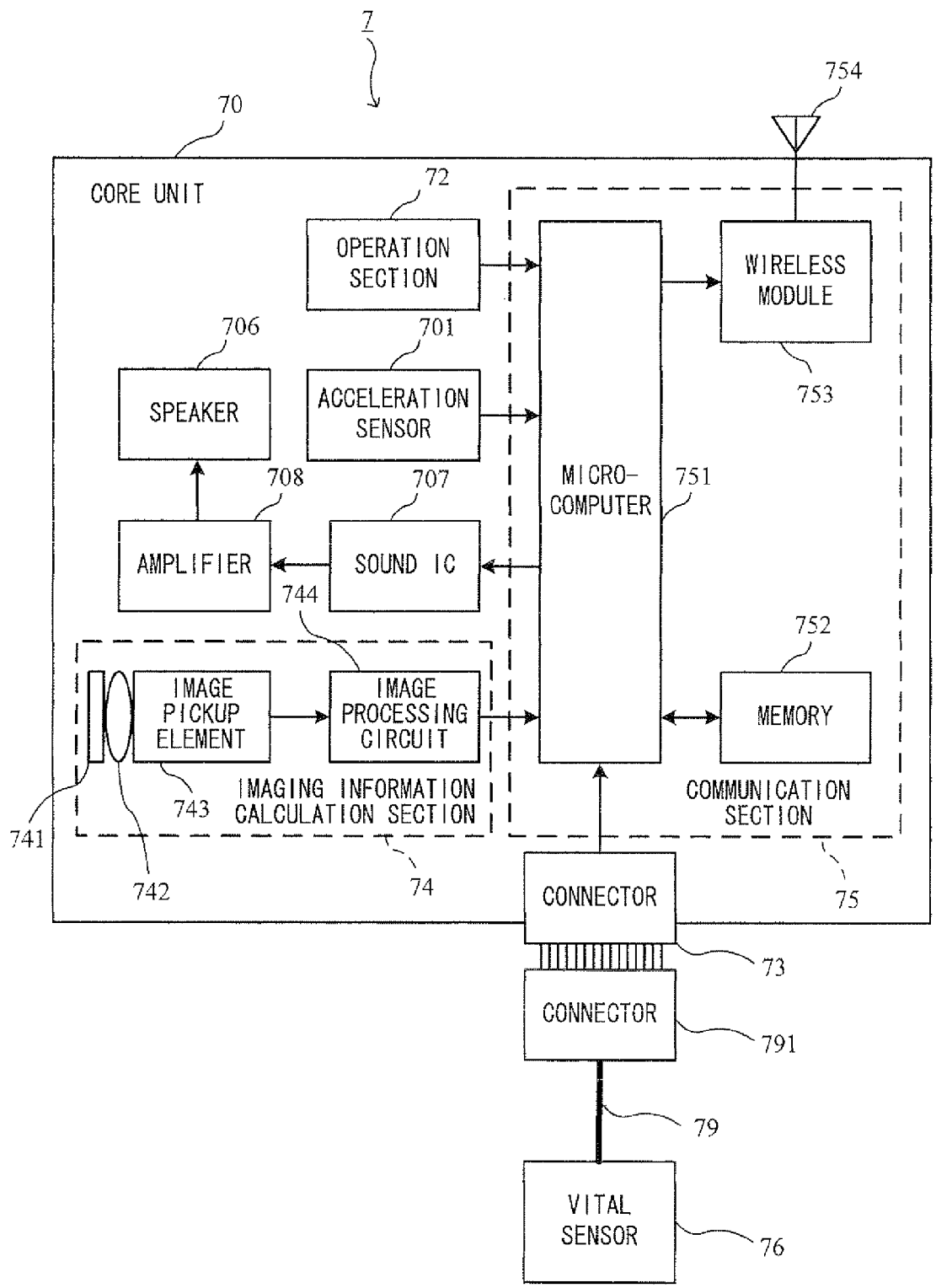
FIG. 7 is a block diagram showing an example of a configuration of the core unit 70 of FIG. 3.

Next, an internal configuration of the controller 7 will be described with reference to FIG. 7. FIG. 7 is a block diagram showing an example of the internal configuration of the controller 7.

As shown in FIG. 7, the core unit 70 includes the communication section 75 in addition to the above-described operation sections 72, the imaging information calculation section 74, the acceleration sensor 701, the vibrator 704, the speaker 706, the sound IC 707, and the amplifier 708. The vital sensor 76 is connected to the microcomputer 751 via the connection cable 79 and connectors 791 and 73.

The imaging information calculation section 74 includes the infrared filter 741, the lens 742, the image pickup element 743, and the image processing circuit 744. The infrared filter 741 allows, among light incident thereon through the front surface of the core unit 70, only infrared light to pass therethrough. The lens 742 condenses the infrared light having passed through the infrared filter 741, and outputs the condensed infrared light to the image pickup element 743. The image pickup element 743 is a solid-state image pickup element such as a CMOS sensor, CCD or the like. The image pickup element 743 takes an image of the infrared light condensed by the lens 742. In other words, the image pickup element 743 takes an image of only the infrared light having passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, and detects a high brightness area of the image, and outputs, to the communication section 75, process result data indicative of results of detecting, for example, position coordinates, a square measure, and the like of the high brightness area. The imaging information calculation section 74 is fixed to the housing 71 of the core unit 70. An imaging direction of the imaging information calculation section 74 can be changed by changing a facing direction of the housing 71.

The process result data outputted from the imaging information calculation section 74 can be used as operation data indicative of: a position designated by using the core unit 70; and the like. For example, the player holds the core unit 70 such that the front surface of the core unit 70 (a side having a light opening through which light is incident on the imaging information calculation section 74 taking an image of the light) faces the monitor 2. On the other hand, the two markers 8L and 8R are provided in the vicinity of the display screen of the monitor 2. The markers 8L and 8R each emit infrared light forward from the monitor 2, and become imaging targets of the imaging information calculation section 74. Then, the game apparatus body 5 calculates a position designated by the core unit 70, by using position data regarding high brightness points based on the two makers 8L and 8R.

For example, when the player holds the core unit 70 such that its front surface faces the monitor 2, the infrared lights outputted from the two markers 8L and 8R are incident on the imaging information calculation section 74. The image pickup element 743 takes images of the incident infrared lights via the infrared filter 741 and the lens 742, and the image processing circuit 744 processes the taken images. In the imaging information calculation section 74, components of the infrared lights outputted from the markers 8L and 8R are detected, whereby positional information (positions of target images) and the like of the markers 8L and 8R on the taken image are obtained. Specifically, the image processing circuit 744 analyzes the image data taken by the image pickup element 743, eliminates, from area information of the taken image, images that are not generated by the infrared lights outputted from the markers 8L and 8R, and then determines the high brightness points as the positions of the markers 8L and 8R. The imaging information calculation section 74 obtains the positional information such as positions of the centers of gravity of the determined high brightness points, and outputs the positional information as the process result data. The positional information, which is the process result data, may be outputted as coordinate values whose origin point is set to a predetermined reference point on a taken image (e.g., the center or the left top corner of the taken image). Alternatively, with the position of the center of gravity at a predetermined timing being set as a reference point, the difference between the reference point and a current position of the center of gravity may be outputted as a vector. That is, in the case where a predetermined reference point is set on the taken image taken by the image pickup element 743, the positional information on the target images is used as parameters representing differences between the positions of the target images and the reference point position. The positional information is transmitted to the game apparatus body 5, whereby, on the basis of the differences between the reference point and the positional information, the game apparatus body 5 is capable of obtaining variations in a signal that corresponds to a movement, an attitude, a position, and the like of the imaging information calculation section 74, i.e., the core unit 70, with respect to the markers 8L and 8R. Specifically, when the core unit 70 is moved, the positions of the centers of gravity of the high brightness points in the image transmitted from the communication section 75 change. Therefore, a direction and a coordinate point are inputted in accordance with the change in the positions of the centers of gravity of the high brightness points, whereby the position designated by the core unit 70 may be regarded as an operation input, and a direction and a coordinate point may be inputted in accordance with a direction in which the core unit 70 moves.

In this manner, the imaging information calculation section 74 of the controller 7 takes the images of the markers (the infrared lights from the markers 8L and 8R in this embodiment) that are located fixedly, whereby data outputted from the controller 7 is processed in the process on the game apparatus body 5, and an operation can be performed in accordance with the movement, the attitude, the position, and the like of the core unit 70. Further, it becomes possible to perform an intuitive operation input that is different from an input performed by pressing an operation button or an operation key. Since the above markers are located in the vicinity of the display screen of the monitor 2, a position of the core unit 70 with respect to the markers can be easily converted to the movement, the attitude, position and the like of the core unit 70 with respect to the display screen of the monitor 2. That is, the process result data based on the movement, the attitude, the position, and the like of the core unit 70 is used as an operation input directly reflected on the display screen of the monitor 2 (e.g., an input of the position designated by the core unit 70), and thus the core unit 70 can be caused to serve as a pointing device with respect to the display screen.

Preferably, the core unit 70 includes a triaxial acceleration sensor 701. The triaxial acceleration sensor 701 detects linear acceleration in three directions, i.e., the up-down direction, the left-right direction, and the front-rear direction. Alternatively, an accelerometer capable of detecting linear acceleration along at least one axis direction may be used. As a non-limiting example, the acceleration sensor 701 may be of the type available from Analog Devices, Inc. or STMicroelectronics N.V. Preferably, the acceleration sensor 701 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide the acceleration sensor 701.

Accelerometers, as used in the acceleration sensor 701, are only capable of detecting acceleration along a straight line (linear acceleration) corresponding to each axis of the acceleration sensor 701. In other words, the direct output of the acceleration sensor 701 is limited to signals indicative of linear acceleration (static or dynamic) along each of the three axes thereof. As a result, the acceleration sensor 701 cannot directly detect movement along a non-linear (e.g., arcuate) path, rotation, rotational movement, angular displacement, inclination, position, orientation or any other physical characteristic. However, through processing by a computer such as a processor of the game apparatus (e.g., the CPU 10) or a processor of the controller (e.g., the microcomputer 751) based on the acceleration signals outputted from the acceleration sensor 701, additional information relating to the core unit 70 can be inferred or calculated (determined), as one skilled in the art will readily understand from the description herein.

The communication section 75 includes the microcomputer 751, a memory 752, the wireless module 753, and the antenna 754. The microcomputer 751 controls the wireless module 753 that wirelessly transmits transmission data, while using the memory 752 as a storage area during processing. The microcomputer 751 also controls operations of the sound IC 707 and the vibrator 704 (not shown) in accordance with data which the wireless module 753 has received from the game apparatus body 5 via the antenna 754. The sound IC 707 processes sound data or the like that is transmitted from the game apparatus body 5 via the communication section 75. Further, the microcomputer 751 activates the vibrator 704 in accordance with vibration data or the like (e.g., a signal for causing the vibrator 704 to be ON or OFF) that is transmitted from the game apparatus body 5 via the communication section 75.

Operation signals from the operation sections 72 provided on the core unit 70 (key data), acceleration signals from the acceleration sensor 701 with respect to the three axial directions (X-, Y- and Z-axis direction acceleration data), and the process result data from the imaging information calculation section 74, are outputted to the microcomputer 751. Also, biological signals (biological information data) provided from the vital sensor 76 are outputted to the microcomputer 751 via the connection cable 79. The microcomputer 751 temporarily stores inputted data (the key data, the X-, Y- and Z-axis direction acceleration data, the process result data, and the biological information data) in the memory 752 as transmission data to be transmitted to the wireless controller module 19. Here, wireless transmission from the communication section 75 to the wireless controller module 19 is performed at predetermined time intervals. Since game processing is generally performed at a cycle of 1/60 sec, the wireless transmission needs to be performed at a shorter cycle. Specifically, game processing is performed at a cycle of 16.7 ms (1/60 sec), and a transmission interval of the communication section 75 configured using the Bluetooth (registered trademark) technology is 5 ms. At a timing of performing transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology to radiate, using a carrier wave having a predetermined frequency, a radio signal from the antenna 754, the radio signal indicative of the series of pieces of operation information. Thus, the key data from the operation sections 72 provided on the core unit 70, the X-, Y- and Z-axis direction acceleration data from the acceleration sensor 701, the process result data from the imaging information calculation section 74, and the biological information data from the vital sensor 76, are transmitted from the core unit 70. The wireless controller module 19 of the game apparatus body 5 receives the radio signal, and the game apparatus body 5 demodulates or decodes the radio signal to obtain the series of pieces of operation information (the key data, the X-, Y- and Z-axis direction acceleration data, the process result data, and the biological information data). In accordance with the series of pieces of obtained operation information and the game program, the CPU 10 of the game apparatus body 5 performs game processing. In the case where the communication section 75 is configured using the Bluetooth (registered trademark) technology, the communication section 75 can have a function of receiving transmission data wirelessly transmitted from other devices.

Figure 8:
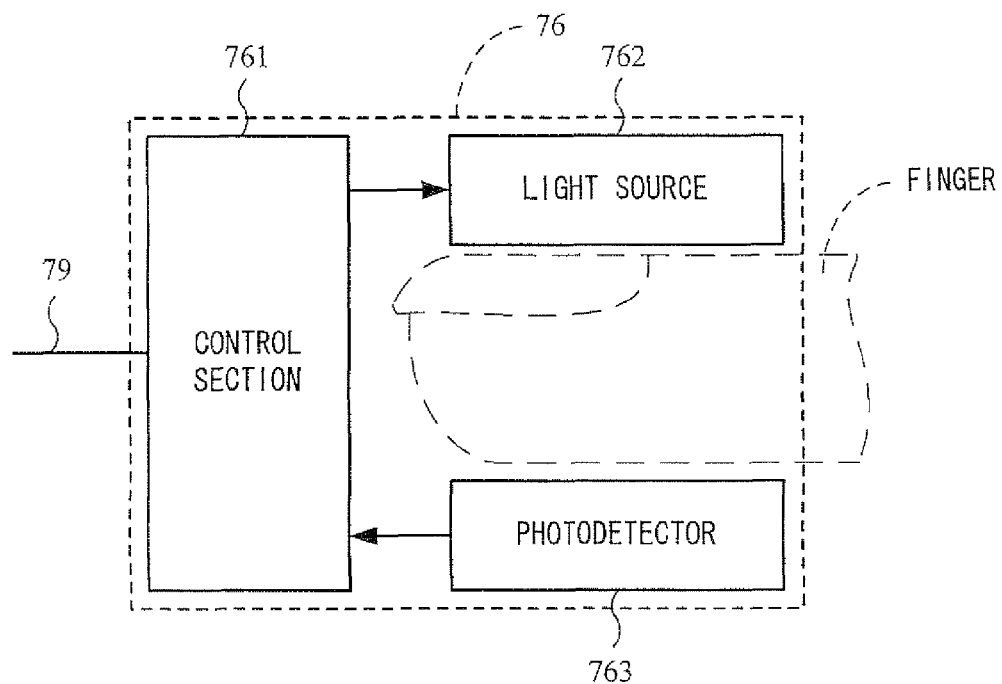
FIG. 8 is a block diagram showing an example of a configuration of a vital sensor 76.
Figure 9:
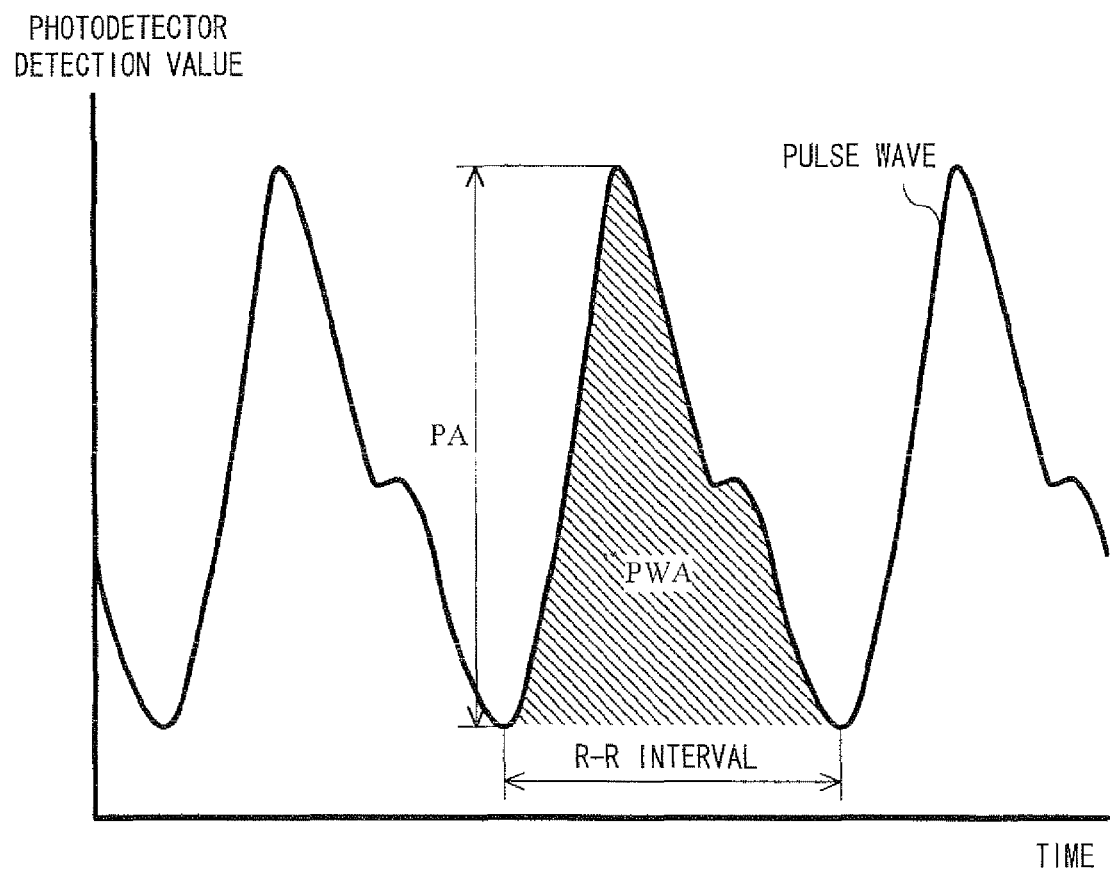
FIG. 9 is a diagram showing an example of pulse wave information that is an example of biological information outputted from the vital sensor 76.

Next, with reference to FIGS. 8 and 9, the vital sensor 76 will be described. FIG. 8 is a block diagram showing an example of a configuration of the vital sensor 76. FIG. 9 is a diagram showing pulse wave information that is an example of biological information outputted from the vital sensor 76.

In FIG. 8, the vital sensor 76 includes a control unit 761, a light source 762, and a photodetector 763.

The light source 762 and the photodetector 763 constitutes a transmission-type digital-plethysmography sensor, which is an example of a sensor that obtains a biological signal of the player. The light source 762 includes, for example, an infrared LED that emits infrared light having a predetermined wavelength (e.g., 940 nm) toward the photodetector 763. On the other hand, the photodetector 763, which includes, for example, an infrared photoresistor, senses the light emitted by the light source 762, depending on the wavelength of the emitted light. The light source 762 and the photodetector 763 are arranged so as to face each other with a predetermined gap (hollow space) being interposed therebetween.

Here, hemoglobin that exists in human blood absorbs infrared light. For example, a part (e.g., a fingertip) of the player's body is inserted in the gap between the light source 762 and the photodetector 763. In this case, the infrared light emitted from the light source 762 is partially absorbed by hemoglobin existing in the inserted fingertip before being sensed by the photodetector 763. Arteries in the human body pulsate, and therefore, the thickness (blood flow rate) of the arteries varies depending on the pulsation. Therefore, similar pulsation occurs in arteries in the inserted fingertip, and the blood flow rate varies depending on the pulsation, so that the amount of infrared light absorption also varies depending on the blood flow rate. Specifically, as the blood flow rate in the inserted fingertip increases, the amount of light absorbed by hemoglobin also increases and therefore the amount of infrared light sensed by the photodetector 763 relatively decreases. Conversely, as the blood flow rate in the inserted fingertip decreases, the amount of light absorbed by hemoglobin also decreases and therefore the amount of infrared light sensed by the photodetector 763 relatively increases. The light source 762 and the photodetector 763 utilize such an operating principle, i.e., convert the amount of infrared light sensed by the photodetector 763 into a photoelectric signal to detect pulsation (hereinafter referred to as a pulse wave) of the human body. For example, as shown in FIG. 9, when the blood flow rate in the inserted fingertip increases, the detected value of the photodetector 763 increases, and when the blood flow rate in the inserted fingertip decreases, the detected value of the photodetector 763 decreases. Thus, a pulse wave portion in which the detected value of the photodetector 763 rises and falls is generated as a pulse wave signal. Note that, in some circuit configuration of the photodetector 763, a pulse wave signal may be generated in which, when the blood flow rate in the inserted fingertip increases, the detected value of the photodetector 763 decreases, and when the blood flow rate in the inserted fingertip decreases, the detected value of the photodetector 763 increases.

The control unit 761 includes, for example, a MicroController Unit (MCU). The control unit 761 controls the amount of infrared light emitted from the light source 762. The control unit 761 also performs A/D conversion on a photoelectric signal (pulse wave signal) outputted from the photodetector 763, to generate pulse wave data (biological information data). Thereafter, the control unit 761 outputs the pulse wave data biological information data) via the connection cable 79 to the core unit 70.

In the game apparatus body 5, the pulse wave data obtained from the vital sensor 76 is analyzed, whereby various biological information on the player using the vital sensor 76 can be detected/calculated. As a first example, in the game apparatus body 5, in accordance with peaks and dips of the pulse wave indicated by the pulse wave data obtained from the vital sensor 76, it is possible to detect a pulse timing of the player a timing at which the heart contracts, more exactly, a timing at which the blood vessels in a player's body part wearing the vital sensor 76 contract or expand). Specifically, in the game apparatus body 5, it is possible to detect, as a pulse timing of the player, for example, a timing at which the pulse wave indicated by the pulse wave data obtained from the vital sensor 76 represents a local minimum value, a timing at which the pulse wave represents a local maximum value, a timing at which a blood vessel contraction rate reaches its maximum value, a timing at which a blood vessel expansion rate reaches its maximum value, a timing at which the acceleration rate of the blood vessel expansion rate reaches its maximum value, a timing at which the deceleration rate of the blood vessel expansion rate reaches its maximum value, or the like. Note that, in the case of detecting, as a pulse timing of the player, a timing at which the acceleration rate of the blood vessel expansion rate reaches its maximum value, or a timing at which the deceleration rate of the blood vessel expansion rate reaches its maximum value, a parameter obtained by differentiating the blood vessel contraction rate or the blood vessel expansion rate, namely, a timing at which the acceleration of the blood vessel expansion or contraction reaches its maximum value, may be detected as the pulse timing of the player.

As a second example, it is possible to calculate a heart rate HR by using the pulse timing of the player detected from the pulse wave indicated by the pulse wave data. For example, a value obtained by dividing 60 seconds by the interval of pulse timings is calculated as the heart rate HR of the player using the vital sensor 76. Specifically, when the timing at which the pulse wave represents the local minimum value is set as the pulse timing, 60 seconds is divided by the interval of heartbeats between adjoining two local minimum values (an R-R interval shown in FIG. 9), whereby the heart rate HR is calculated.

As a third example, it is possible to calculate a respiratory cycle of the player by using a rise-fall cycle of the heart rate HR. Specifically, when the heart rate HR calculated in this embodiment is rising, it is determined that the player is breathing in, and when the heart rate HR is falling, it is determined that the player is breathing out. That is, by calculating the rise-fall cycle (fluctuation cycle) of the heart rate HR, it is possible to calculate the cycle of breathing (respiratory cycle) of the player.

As a fourth example, it is possible to determine the degree of easiness and difficulties felt by the player by using an amplitude PA of the pulse wave indicated by the pulse wave data obtained from the vital sensor 76 (e.g., the difference in the height between a local maximum value of the pulse wave and the succeeding local minimum value; see FIG. 9). Specifically, when the amplitude PA of the pulse wave is decreased, it can be determined that the player is in a difficult state.

As a fifth example, it is possible to obtain a blood flow rate of the player by dividing a pulse wave area PWA (see FIG. 9) obtained from the pulse wave signal by the heart rate HR.

As a sixth example, it is possible to calculate a coefficient of variance of the heartbeat of the player (coefficient of variance of R-R interval: CVRR) by using the interval of the pulse timings of the player (the interval of heartbeats; e.g., an R-R interval shown in FIG. 9) detected from the pulse wave indicated by the pulse wave data. For example, the coefficient of variance of the heartbeat is calculated by using the interval of heartbeats based on the past 100 beats indicated by the pulse wave obtained from the vital sensor 76. Specifically, the following equation is applied for calculation.

Coefficient of variance of heartbeat={(standard deviation of the interval of 100 heartbeats)/(average value of the interval of 100 heartbeats)}× 100

With the use of the coefficient of variance of the heartbeat, it is possible to calculate the state of the autonomic nerve of the player (e.g., the activity of the parasympathetic nerve).

Figure 10:
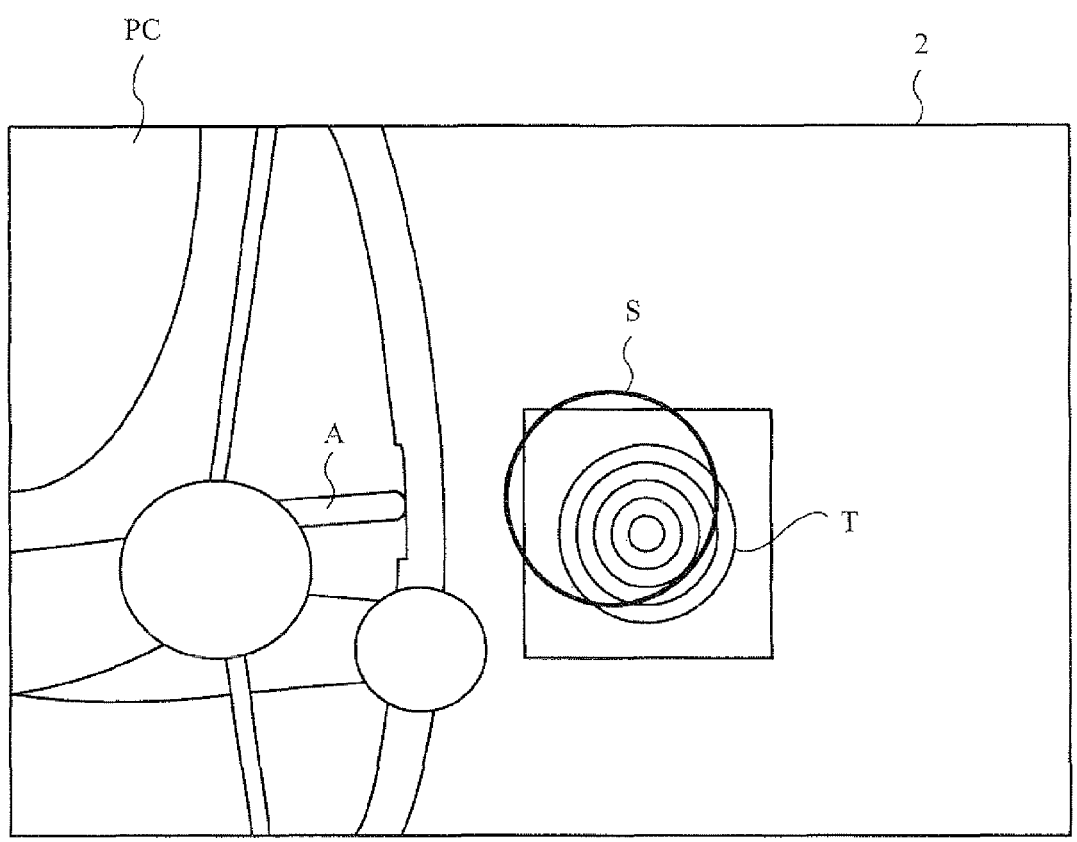
FIG. 10 is a diagram showing an example of a game image displayed on a monitor 2.
Figure 11:
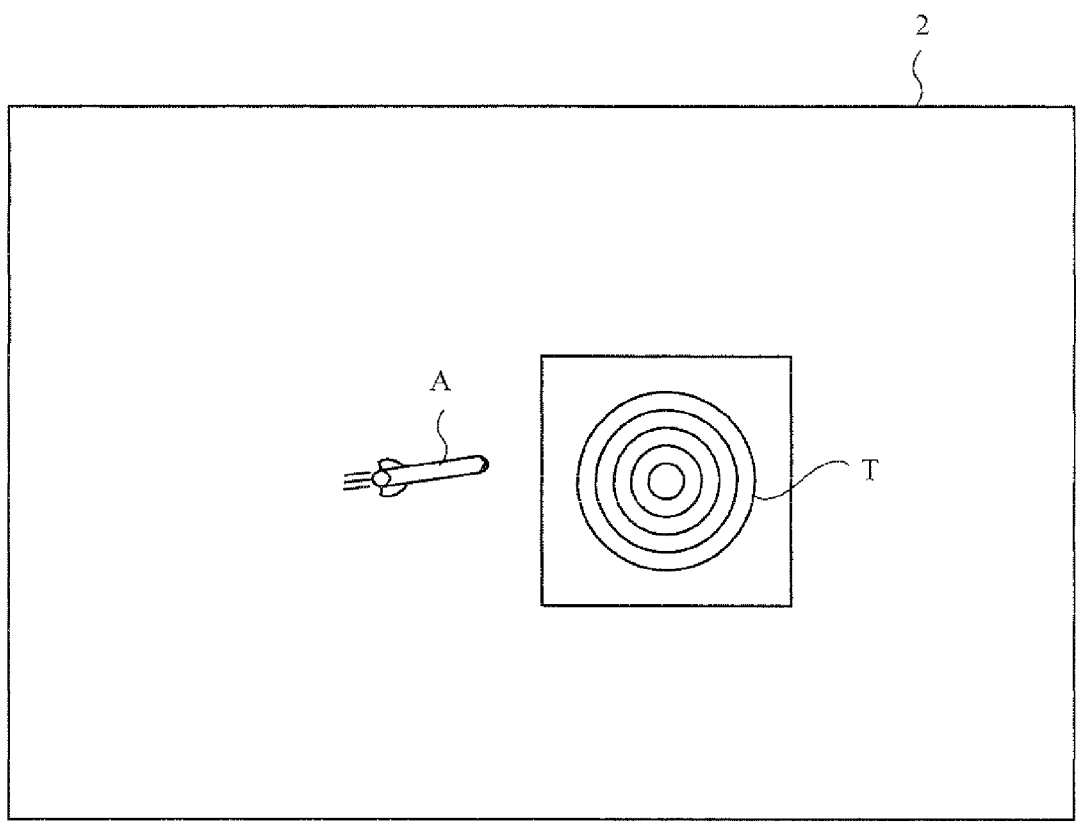
FIG. 11 is a diagram showing an example of the game image displayed on the monitor 2.
Figure 12:
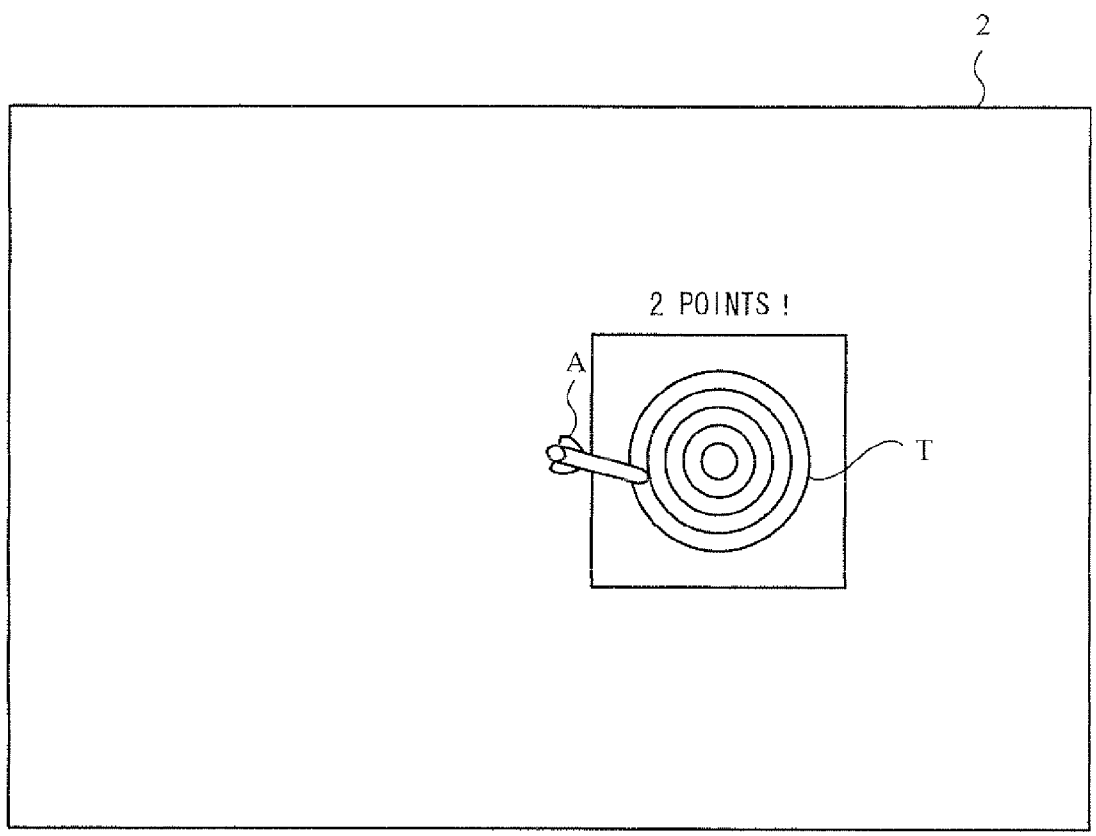
FIG. 12 is a diagram showing an example of the game image displayed on the monitor 2.

Next, an overview of game processing performed on the game apparatus body 5 will be described with reference to FIGS. 10 to 13D before a specific description of processes performed by the game apparatus body 5 is given. FIGS. 10 to 12 are diagrams each showing an example of a game image displayed on the monitor 2. FIGS. 13A to 13D are diagrams each showing an example of a movement of a shooting aim S displayed on the monitor 2.

In FIG. 10, the monitor 2 represents a virtual game world in which a player character PC and a target object T are arranged. In the example of FIG. 10, a game is used in which an event (e.g., archery and Kyudo (the Japanese art of archery)) in which the player character PC shoots an arrow (arrow object A) is performed in the virtual game world. In the virtual game world, a target of archery is provided as the target object T. The player character PC holds a bow with the set arrow object A being drawn, and the arrow object A is released from the bow in accordance with an operation of the player.

In a state before the player character PC releases the arrow object A, the shooting aim S is displayed as a rough indication for a position and a direction toward and in which the arrow object A is discharged when being released. For example, the player can move the position of the shooting aim S in an up, down, right, or left direction in the display screen of the monitor 2 by operating the operation section 72 (e.g., the cross key 72a) provided in the core unit 70. Thus, the player moves a position (direction) to which the player character PC shoots the arrow object A, to a desired position (direction) by operating the operation section 72. The positional relation between the shooting aim S and the virtual game world is a relative relation. Thus, the shooting aim S may be displayed in a fixed manner with respect to the display screen, and the virtual game world may be moved and displayed on the display screen in accordance with an operation of the operation section 72. Alternatively, in accordance with an operation of the operation section 72, the displayed position of the shooting aim S with respect to the display screen may be moved and the virtual game world may be also moved and displayed on the display screen. The following will describe an example in which the displayed position of the shooting aim S is moved in an up, down, right, or left direction in the display screen of the monitor 2 by operating the operation section 72.

As shown in FIG. 11, the arrow object A is released in accordance with an operation of the player for releasing the arrow object A (e.g., an operation of pressing the A button 72d or the B button 72i; hereinafter may be described as a discharge operation), and moves (flies) in the virtual game world with a destination position set in the virtual game world by the shooting aim S, being a destination. As shown in FIG. 12, a score corresponding to a position at which the arrow object A finally reaches is given to the player character PC.

The position of the shooting aim S is changed in accordance with not only an operation of the operation section 72 performed by the player but also biological information (a biological signal) obtained from the player. For example, as shown in FIGS. 13A to 13D, the position of the shooting aim S is changed so as to wobble about a position set by an operation of the operation section 72, in accordance with the biological signal obtained from the player. Specifically, in accordance with a pulse timing of the player, a wobbling direction, a wobbling range, a wobbling time, and the like are set for the shooting aim S. Then, wobbling of the shooting aim S is started on the basis of the set conditions (a state in FIG. 13B). Thus, the shooting aim S is displayed on the monitor 2 so as to wobble in the set wobbling direction (e.g., a direction D in the drawing) and in the set wobbling range (e.g., a wobbling range of reciprocation between a shooting aim position Sa and a shooting aim position Sb.

Figure 13A:
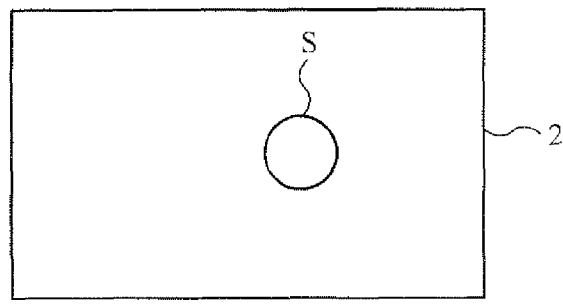
FIG. 13A is a diagram showing an example of a first stage indicating a movement of a shooting aim S displayed on the monitor 2.
Figure 13B:
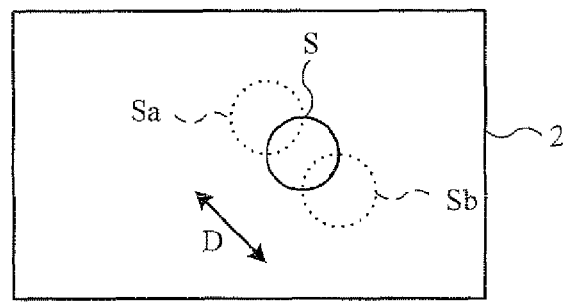
FIG. 13B is a diagram showing an example of a second stage indicating a movement of the shooting aim S displayed on the monitor 2.
Figure 13C:
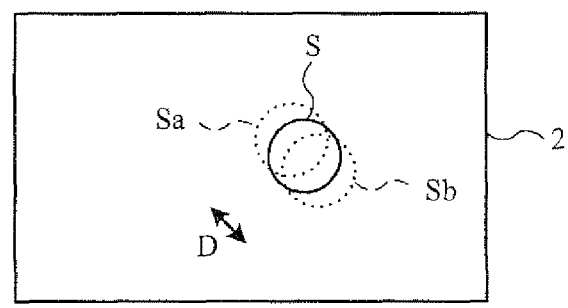
FIG. 13C is a diagram showing an example of a third stage indicating a movement of the shooting aim S displayed on the monitor 2.
Figure 13D:
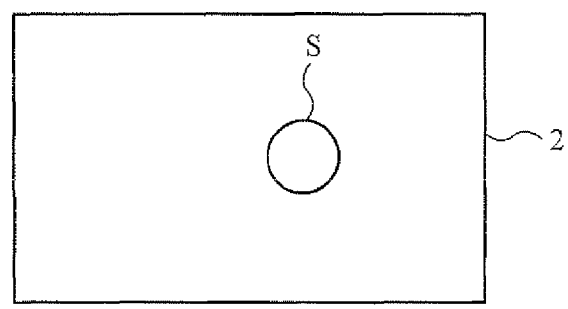
FIG. 13D is a diagram showing an example of a fourth stage indicating a movement of the shooting aim S displayed on the monitor 2.

Then, the wobbling range of the shooting aim S is reduced in accordance with the set wobbling time (a state in FIG. 13C), and the wobbling of the shooting aim S stops at the time when the wobbling time elapses (a state in FIG. 13D). Then, at the next pulse timing of the player, the shooting aim S starts wobbling similarly as in the above. In this manner, the shooting aim S is displayed so as to intermittently wobble in accordance with pulse timings of the player.

When the shooting aim S is displayed so as to wobble in this manner, it is difficult for the player to take aim at a position to be shot by the arrow object A. As described above, when the arrow object A is released, the arrow object A moves (flies) in the virtual game world with a destination position set in the virtual game world by the shooting aim S, being a destination. Thus, in order to obtain a high score, it is necessary to perform a discharge operation with the shooting aim S being set at a position that gives a high score when being shot. Therefore, when the shooting aim S is displayed so as to wobble, it is difficult to set the shooting aim S at a position that gives a high score, and a highly entertaining operation whose result cannot be easily anticipated by the player is possible. As described above, since the positional relation between the shooting aim S and the virtual game world is a relative relation, the shooting aim S may be displayed in a fixed manner with respect to the display screen, and the virtual game world may be displayed on the display screen so as to wobble. Alternatively, the shooting aim S may be displayed so as to wobble with respect to the display screen, and the virtual game world may be also displayed on the display screen so as to wobble. In the following description, an example will be used in which the displayed position of the shooting aim S is changed in accordance with the biological signal obtained from the player.

As described later in detail, a wobbling range and a wobbling time of the shooting aim S are calculated on the basis of the heart rate HR calculated from the biological signal of the player, and a wobbling direction in which the shooting aim S wobbles is randomly set. Thus, the wobbling direction, the wobbling range, and the wobbling time of the shooting aim S cannot be easily anticipated by the player, and hence a more highly entertaining operation is possible.

Figure 14:
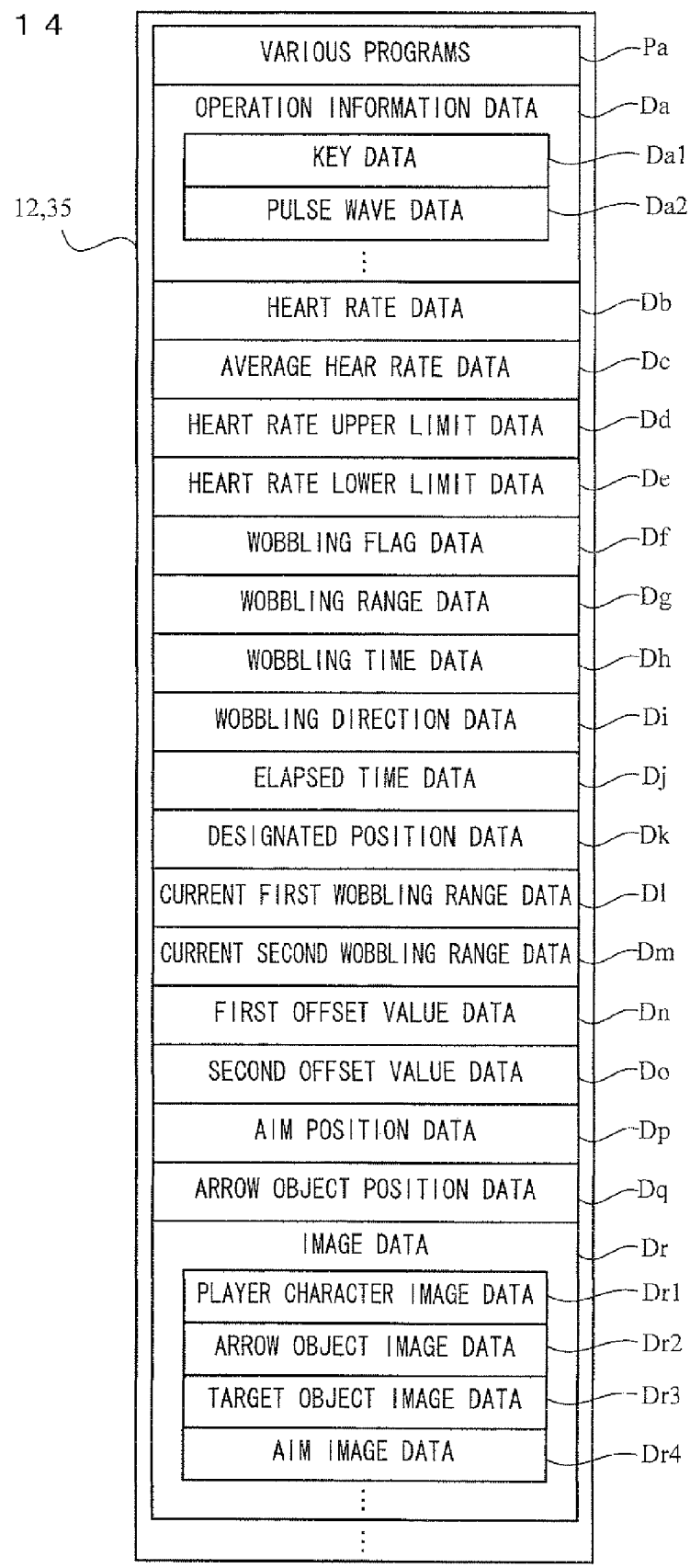
FIG. 14 is a diagram showing an example of main data and programs that are stored in a main memory of the game apparatus body 5.

The following will describe in detail the game processing performed on the game system 1. With reference to FIG. 14, main data used in the game processing will be described. FIG. 14 is a diagram showing an example of main data and programs stored in the external main memory 12 and/or the internal main memory 35 (hereinafter, the two main memories are collectively referred to a main memory) of the game apparatus body 5.

As shown in FIG. 14, a data storage area of the main memory stores therein operation information data Da, heart rate data Db, average heart rate data Dc, heart rate upper limit data Dd, heart rate lower limit data De, wobbling flag data Df, wobbling range data Dg, wobbling time data Dh, wobbling direction data Di, elapsed time data Dj, designated position data Dk, current first wobbling range data Dl, current second wobbling range data Dm, first offset value data Dn, second offset value data Do, aim position data Dp, arrow object position data Dq, image data Dr, and the like. Note that, in addition to the data shown in FIG. 14, the main memory stores therein data required for the game processing, such as data (position data and the like) on other objects appearing in the game, data on the virtual game world (background data and the like). A program storage area of the main memory stores therein various programs Pa configuring the game program.

The operation information data Da includes key data Da1, pulse wave data Da2, and the like. The key data Da1 indicates that the plurality of operation sections 72 in the core unit 70 have been operated, and is included in the series of pieces of operation information transmitted as transmission data from the core unit 70. Note that the wireless controller module 19 included in the game apparatus body 5 receives key data included in the operation information transmitted from the core unit 70 in predetermined cycles (e.g., every 1/200 sec) and stores the received data into a buffer (not shown) included in the wireless controller module 19. Thereafter, the key data stored in the buffer is read every one-frame period (e.g., every 1/60 sec.), which corresponds to a game processing cycle, and thereby the key data Da1 in the main memory is updated.

In this case, the cycle of the reception of the operation information is different from the processing cycle, and therefore, a plurality of pieces of operation information received at a plurality of timings are stored in the buffer. In a description of the processing below, only the latest one of a plurality of pieces of operation information received at a plurality of timings is invariably used to perform a process at each step described below, and the processing proceeds to the next step.

In addition, a process flow will be described below by using an example in which the key data Da1 is updated every one-frame period, which corresponds to the game processing cycle. However, the key data Da1 may be updated in other processing cycles. For example, the key data Da1 may be updated in transmission cycles of the core unit 70, and the updated key data Da1 may be used in game processing cycles. In this case, the cycle in which the key data Da1 is updated is different from the game processing cycle.

The pulse wave data Da2 indicates a pulse wave signal of a required time length obtained from the vital sensor 76, and is included in the series of pieces of operation information transmitted as transmission data from the core unit 70. A history of a pulse wave signal of a time length required in the processing described below is stored as pulse wave data into the pulse wave data Da2, and is updated as appropriate in response to reception of operation information.

The heart rate data Db indicates a history of heart rates HR (each of which is, for example, a value obtained by dividing 60 seconds by the interval of heartbeats (e.g., R-R interval)) of the player for a predetermined time period.

The average heart rate data Dc indicates the average value of the heart rate HR of the player. The heart rate upper limit data Dd and the heart rate lower limit data De respectively indicates a upper limit and a lower limit of the heart rate HR that are set on the basis of the average value of the heart rate HR.

The wobbling flag data Df indicates whether or not the shooting aim S is wobbling, and indicates a wobbling flag that is set to be ON when the shooting aim S is wobbling. As an example, the wobbling flag is set to be ON in accordance with a pulse timing of the player. Then, the wobbling flag is set to be OFF when a wobbling time during which the shooting aim S is displayed in a wobbling manner elapses, or in accordance with the player performing a discharge operation while the shooting aim S is wobbling. The wobbling range data Dg indicates a wobbling range Xmax of the shooting aim S that is set in accordance with a pulse timing of the player. The wobbling time data Dh indicates a wobbling time Tmax of the shooting aim S that is set in accordance with a pulse timing of the player. The wobbling direction data Di indicates a wobbling direction D of the shooting aim S that is set in accordance with a pulse timing of the player. The elapsed time data Dj indicates an elapsed time T that passes after the shooting aim S starts wobbling. As described later in detail, in this embodiment, the shooting aim S is moved so as to wobble by combining two wobbling movements, and the wobbling range data Dg, the wobbling time data Dh, the wobbling direction data Di, and the elapsed time data Dj indicate set values for each wobbling movement.

The designated position data Dk indicates a designated position of the player in the virtual game world displayed on the display screen, which designated position is set in accordance with an operation of the operation section 72 performed by the player. The current first wobbling range data Dl indicates a wobbling range X1 of a first wobbling movement at the current moment. The current second wobbling range data Dm indicates a wobbling range X2 of a second wobbling movement at the current moment. The first offset value data Dn indicates a first offset value of1 for offsetting the position of the shooting aim S in the first wobbling movement at the current moment. The second offset value data Do indicates a second offset value of2 that is obtained by adding a value for offsetting the position of the shooting aim S in the second wobbling movement at the current moment, to the offset value for the first wobbling movement at the current moment (the first offset value of1).

The aim position data Dp indicates the position of the shooting aim S in the virtual game world. The arrow object position data Dg indicates the position of the arrow object A in the virtual game world.

The image data Dr includes player character image data Dr1, arrow object image data Dr2, target object image data Dr3, aim image data Dr4, and the like. The player character image data Dr1 is data for arranging the player character PC in the virtual game world thereby to generate a game image. The arrow object image data Dr2 is data for arranging the arrow object A in the virtual game world thereby to generate a game image. The target object image data Dr3 is data for arranging the target object T in the virtual game world thereby to generate a game image. The aim image data Dr4 is data for arranging the shooting aim S in the virtual game world thereby to generate a game image.

Figure 15:
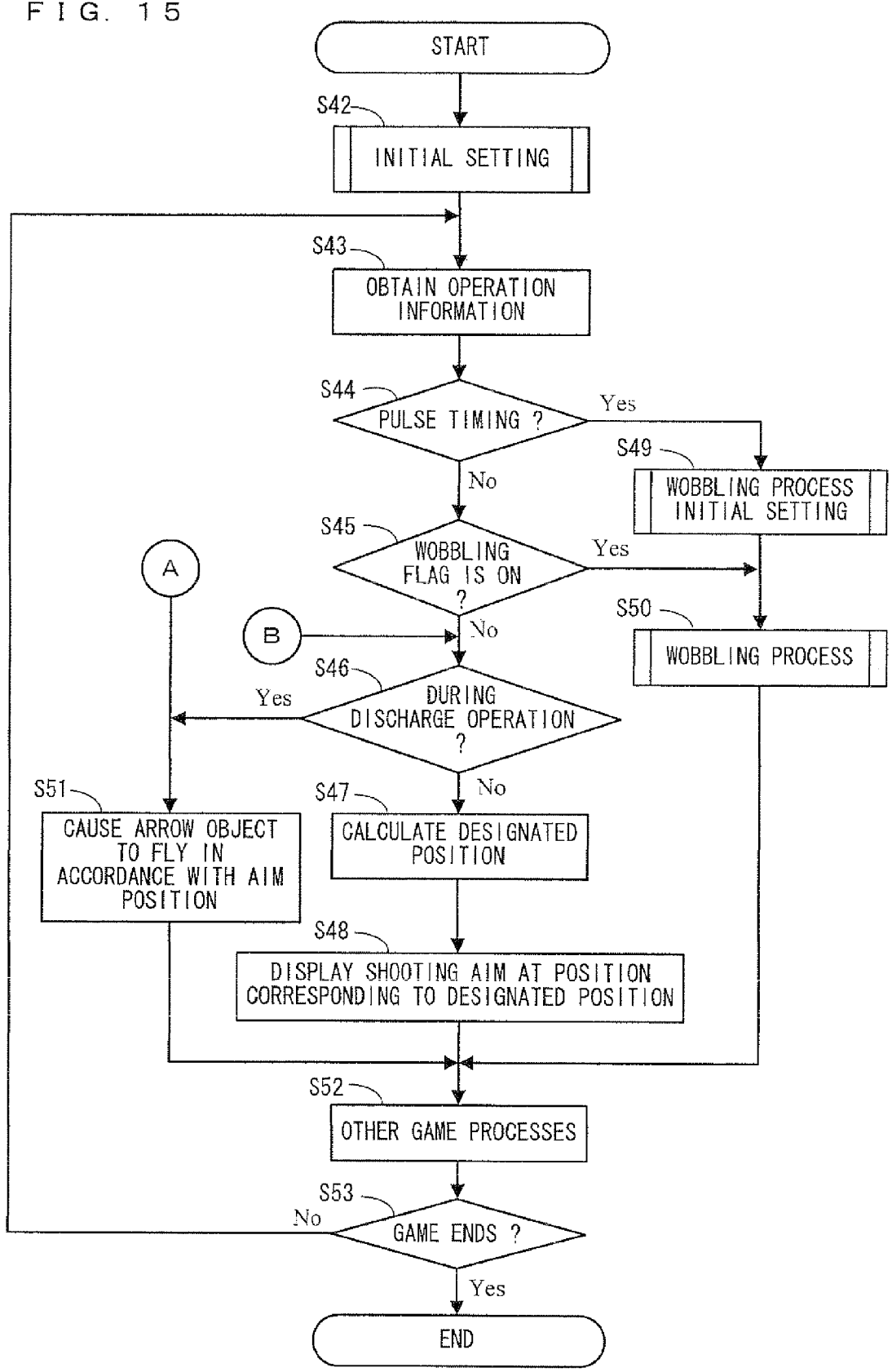
FIG. 15 is a flowchart showing an example of game processing performed on the game apparatus body 5.
Figure 16:
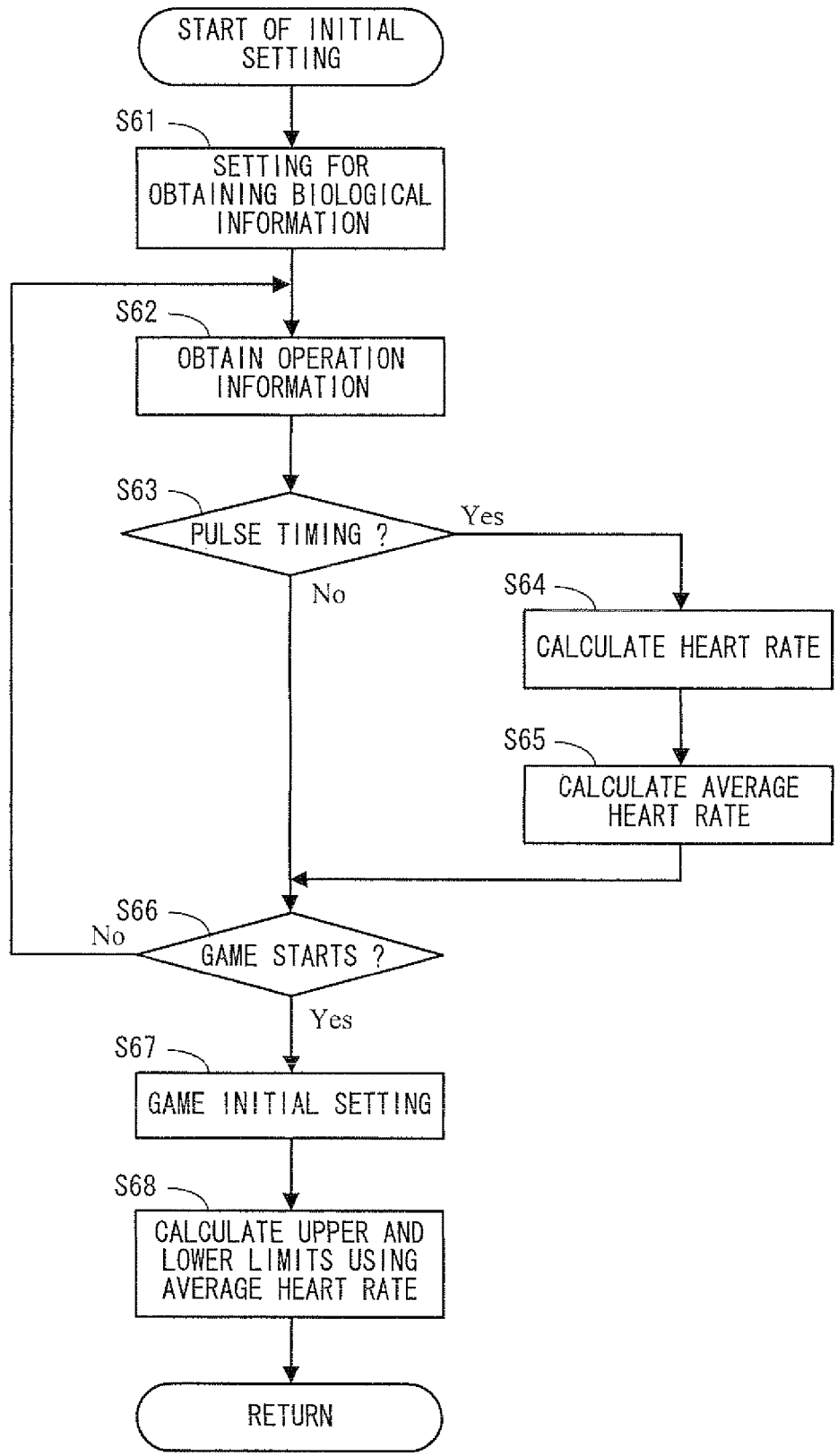
FIG. 16 is a subroutine flowchart showing an example of detailed processing of initial setting shown at step 42 in FIG. 15.
Figure 17:
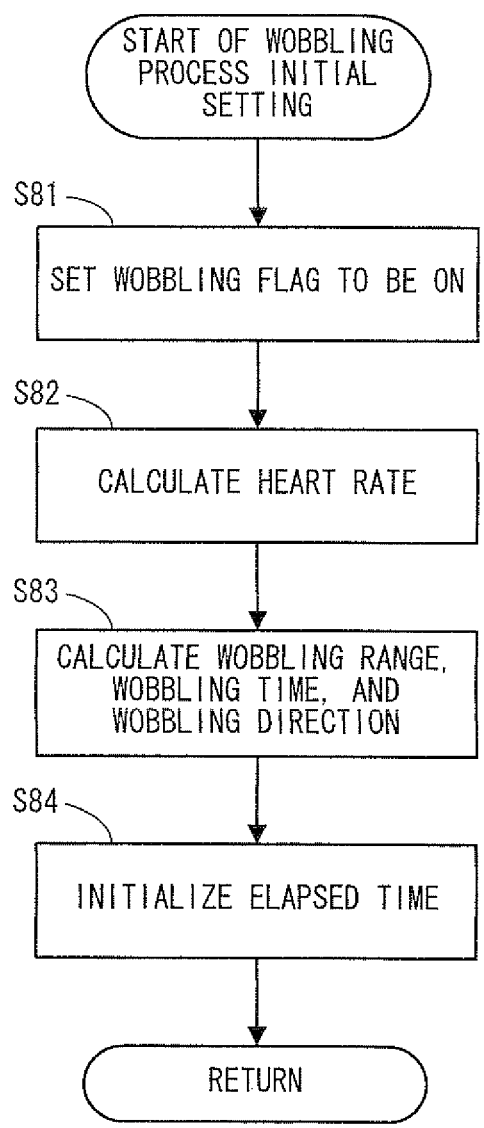
FIG. 17 is a subroutine flowchart showing an example of detailed processing of wobbling process initial setting shown at step 49 in FIG. 15.
Figure 18:
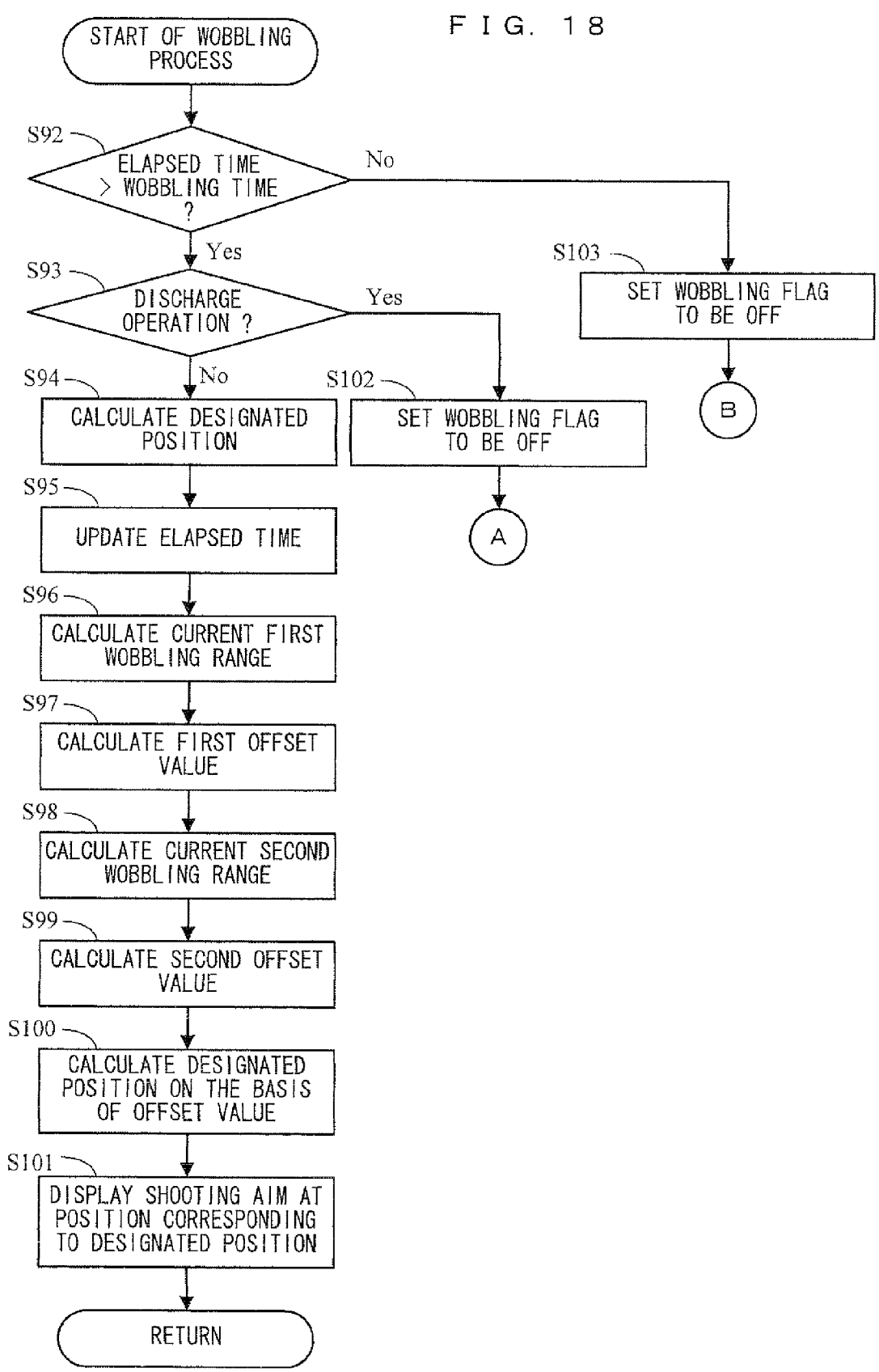
FIG. 18 is a subroutine flowchart showing an example of detailed processing of a wobbling process shown at step 50 in FIG. 15.

Next, the game processing performed on the game apparatus body 5 will be described in detail with reference to FIGS. 15 to 18. FIG. 15 is a flowchart showing an example of the game processing performed on the game apparatus body 5. FIG. 16 is a subroutine flowchart showing an example of detailed processing of initial setting shown at step 42 in FIG. 15. FIG. 17 is a subroutine flowchart showing an example of detailed processing of wobbling process initial setting shown at step 49 in FIG. 15. FIG. 18 is a subroutine flowchart showing an example of detailed processing of a wobbling process shown at step 50 in FIG. 15. In the flowcharts shown in FIGS. 15 to 18, of the game processing, processes using the biological information from the vital sensor 76 and the key data from the core unit 70 will be mainly described, and other game processes that do not directly relate to the present invention will not be described in detail. In FIGS. 15 to 18, each step executed by the CPU 10 is abbreviated to "S".

When the game apparatus body 5 is powered on, the CPU 10 of the game apparatus body 5 executes the boot program stored in the ROM/RTC 13, thereby initializing each unit such as the main memory. Thereafter, the game program stored in the optical disc 4 is loaded into the main memory, and the CPU 10 starts execution of the game program. The flowchart shown in FIG. 15 indicates game processing that is performed after completion of the aforementioned process.

In FIG. 15, the CPU 10 performs initial setting (step 42), and proceeds the processing to the next step. With reference to FIG. 16, the following will describe the initial setting performed at step 42.

In FIG. 16, the CPU 10 performs setting for obtaining biological information from the player (step 61), and proceeds the processing to the next step. For example, the CPU 10 initializes each parameter used in the subsequent processing. Then, the CPU 10 instructs the player to wear the vital sensor 76, which is an input device for obtaining biological information from the player, via the monitor 2. Note that the instruction to the player to wear the vital sensor 76 may be performed, not by display on the monitor 2, but by other means that can be sensed by the player, such as a voice, or by a combination thereof. Then, after the optical system of the vital sensor 76 recognizes that the player wears the vital sensor 76, the vital sensor 76 starts obtaining a biological signal from the body of the player, and transmits data indicative of the biological signal, to the game apparatus body 5.

Next, the CPU 10 obtains data indicative of operation information, from the core unit 70 (step 62), and proceeds the processing to the next step. For example, the CPU 10 obtains operation information received from the core unit 70, and updates the key data Da1 with details of operations performed on the operation section 72 which details are indicated by the latest key data included in the operation information. Further, the CPU 10 updates the pulse wave data Da2 with a pulse wave signal indicated by the latest biological information data that is included in the operation information received from the core unit 70.

Next, the CPU 10 determines whether or not the current moment is a pulse timing (step 63). When the current moment is a pulse timing, the CPU 10 proceeds the processing to the next step 64. On the other hand, when the current moment is not a pulse timing, the CPU 10 proceeds the processing to the next step 66. For example, at step 63, the CPU 10 refers to the pulse wave signal indicated by the pulse wave data Da2 and detects a predetermined shape characteristic point in a pulse wave. If the current moment corresponds to the shape characteristic point, the CPU 10 determines that the current moment is a pulse timing. For example, as the shape characteristic point, any one point is selected from among: a point at which the pulse wave represents a local minimum value; a point at which the pulse wave represents a local maximum value; a point at which the contraction rate of the blood vessels represents a maximum value; a point at which the expansion rate of the blood vessels represents a maximum value; a point at which the acceleration rate of the blood vessel expansion rate represents a maximum value; a point at which the deceleration rate of the blood vessel expansion rate represents a maximum value; and the like. Any of these points may be used as a shape characteristic point for determination of a pulse timing.

At step 64, the CPU 10 calculates the heart rate HR of the player, updates the heartbeat data Db, and proceeds the processing to the next step. For example, the CPU 10 refers to the pulse wave signal based on the pulse wave data Da2, and calculates, as the interval of heartbeats at the current moment, a time interval between a pulse timing currently detected at step 63 and the pulse timing detected in the immediately preceding processing (e.g., the R-R interval; see FIG. 9). Then, the CPU 10 calculates the heart rate HR by dividing 60 seconds by the interval of heartbeats, and updates the heart rate data Db with the newly calculated heart rate HR. Note that, when the pulse timing is detected for the first time in the current processing, the CPU 10 updates the heart rate data Db using the heart rate HR as a predetermined constant (e.g., 0), for example. Specifically, the CPU 10 performs update by: shifting forward, in time-series order, the heart rates HR in the history for the predetermined time period which history is stored in the heart rate data Db; and adding, as the latest heart rate HR, the newly calculated heart rate HR to the heart rate data Db. By so doing, a latest history of the heart rates HR for the predetermined time period is stored in the heart rate data Db.

Next, the CPU 10 calculates the average value of the heart rate HR of the player and updates the average heart rate data Do (step 65), and proceeds the processing to the next step 66. For example, the CPU 10 calculates the average value of the heart rate HR using the history of the heart rates HR for the predetermined time period which history is stored in the heart rate data Db. Then, the CPU 10 updates the average heart rate data Dc with the calculated average value.

At step 66, the CPU 10 determines whether or not to start the game. The game is started, for example, when the player performs an operation for starting the game. Then, when starting the game, the CPU 10 proceeds the processing to the next step 67. On the other hand, when not starting the game, the CPU 10 returns to step 62 to repeat the processing.

At step 67, the CPU 10 performs initial setting of the game processing, and proceeds the processing to the next step. For example, in the initial setting of the game processing at step 67, the CPU 10 performs setting of the virtual game world and initial setting of the player character PC and the like. Further, in the initial setting of the game processing at step 67, the CPU 10 initializes each parameter (except the operation information data Da, the heart rate data Db, and the average heart rate data Dc) used in the subsequent game processing.

Next, the CPU 10 calculates an upper limit and a lower limit of the heart rate HR using the average value of the heart rate HR of the player (step 68), and ends the processing of this subroutine. For example, the CPU 10 calculates the upper limit and the lower limit of the heart rate HR on the basis of the average value of the heart rate HR indicated by the average heart rate data Dc, and updates the heart rate upper limit data Dd and the heart rate lower limit data De with the calculated upper limit and the calculated lower limit. As one example, the CPU 10 calculate the upper limit of the heart rate HR by adding a predetermined value (e.g., 20) to the average value of the heart rate HR. Further, the CPU 10 calculates the lower value of the heart rate HR by subtracting a predetermined value (e.g., 20) from the average value of the heart rate HR. Note that the calculated upper limit and the calculated lower limit may be limited. For example, a maximum limit value is previously provided for the upper limit of the heart rate HR, and, when the calculated upper limit exceeds the maximum limit value, the heart rate upper limit data Dd is updated with the maximum limit value. Further, a minimum limit value is previously provided for the lower limit of the heart rate HR, and, when the calculated lower limit is less than the minimum limit value, the heart rate lower limit data De is updated with the minimum limit value.

Referring back to FIG. 15, after the initial setting at step 42, the CPU 10 obtains data indicative of operation information, from the core unit 70 (step 43), and proceeds the processing to the next step. For example, the CPU 10 obtains operation information received from the core unit 70, and updates the key data Da1 with details of operations performed on the operation section 72 which details are indicated by the latest key data included in the operation information. Further, the CPU 10 updates the pulse wave data Da2 with a pulse wave signal indicated by the latest biological information data that is included in the operation information received from the core unit 70.

Next, the CPU 10 determines whether or not the current moment is a pulse timing (step 44). When the current moment is not a pulse timing, the CPU 10 proceeds the processing to the next step 45. On the other hand, when the current moment is a pulse timing, the CPU 10 proceeds the processing to the next step 49. The process for the determination of a pulse timing is the same as that at the above step 63, and thus the detailed description thereof is omitted.

At step 45, the CPU 10 refers to the wobbling flag data Df and determines whether or not the wobbling flag is set to be ON. When the wobbling flag is OFF, the CPU 10 proceeds the processing to the next step 46. On the other hand, when the wobbling flag is ON, the CPU 10 proceeds the processing to the next step 50.

At step 46, the CPU 10 determines whether or not current moment is during a discharge operation. For example, when the operation information obtained at step 43 indicates a discharge operation (e.g., an operation of pressing the A button 72*d* or the B button 72*i*), or when it is during a period from a time when the arrow object A is released from the bow to a time when the next arrow object A is set on the bow again, the CPU 10 determines that the current moment is during the discharge operation. When the current moment is not during the discharge operation, the CPU 10 proceeds the processing to the next step 47. On the other hand, when the current moment is during the discharge operation, the CPU 10 proceeds the processing to the next step 51.

At step 47, the CPU 10 calculates a designated position corresponding to an operation of the player, and proceeds the processing to the next step. Here, the designated position is a position designated by the player with respect to the display screen of the monitor 2 or the virtual game world displayed on the display screen. For example, the designated position is indicated by coordinate data based on a coordinate system that is set for the display screen or a coordinate system that is set for the virtual game world. At step 47, the CPU 10 changes the designated position indicated by the designated position data Dk, for example, in accordance with an operation state of the operation section 72 (e.g., the cross key 72*a*) which is indicated by the operation information obtained at step 43. For example, the CPU 10 changes the designated position indicated by the designated position data Dk, such that the designated position moves by a predetermined distance in a direction corresponding to the pressed portion of the cross key 72*a*, and updates the designated position data Dk with the designated position after the change. When the player does not perform an operation for moving the designated position, the CPU 10 keeps the designated position indicated by the designated position data Dk, at the current position, and proceeds the processing to the next step.

Next, the CPU 10 calculates an aim position corresponding to the designated position and displays the shooting aim S at a position corresponding to the designated position (e.g., at the designated position or the aim position) (step 48), and proceeds the processing to the next step 52. For example, the CPU 10 calculates the aim position corresponding to the designated position indicated by the designated position data Dk, and updates the aim position data Dp with the calculated aim position. As one example, when the designated position is indicated as a position based on the coordinate system that is set for the display screen, the CPU 10 calculates, as an aim position, a position obtained by performing projective transformation (perspective transformation) of the designated position into the virtual game world, and updates the aim position data Dp. As another example, when the designated position is indicated as a position based on the coordinate system that is set for the virtual game world, the CPU 10 uses, as an aim position, the designated position indicated by the designated position data Dk, and updates the aim position data Dp with the used aim position. Then, the CPU 10 arranges the shooting aim S at the designated position based on the coordinate system that is set for the display screen or at the aim position based on the coordinate system that is set for the virtual game world, and displays the shooting aim S together with the virtual game world on the monitor 2.

On the other hand, when it is determined at step 44 that the current moment is a pulse timing, the CPU 10 performs a wobbling process initial setting (step 49) and proceeds the processing to the next step. With reference to FIG. 17, the following will describe the wobbling process initial setting performed at step 49.

In FIG. 17, the CPU 10 sets the wobbling flag to be ON and updates the wobbling flag data Df (step 81), and proceeds the processing to the next step.

Next, the CPU 10 calculates the heart rate HR of the player and updates the heart rate data Db (step 82), and proceeds the processing to the next step. The method of calculating the heart rate HR and the method of updating the heart rate data Db are the same as those at the above step 64, and thus the detailed description thereof is omitted.

Next, the CPU 10 calculates the wobbling range Xmax, the wobbling time Tmax, and the wobbling direction D (step 83), and proceeds the processing to the next step. In this embodiment, the shooting aim S is moved so as to wobble by combining two wobbling movements (the first wobbling movement and the second wobbling movement). Thus, at step 83, the CPU 30 calculates wobbling ranges Xmax1 and Xmax2, wobbling times Tmax1 and Tmax2, and wobbling directions D1 and D2 for the both wobbling movements. Then, the CPU 10 updates the wobbling range data Dg, the wobbling time data Dh, and the wobbling direction data Di with the calculated wobbling ranges Xmax1 and Xmax2, the calculated wobbling times Tmax1 and Tmax2, and the calculated wobbling directions D1 and D2, respectively. The following will describe an example of calculation of the wobbling range, the wobbling time, and the wobbling direction for each wobbling movement.

The first wobbling movement is a wobbling movement such that, when the wobbling of the shooting aim S stops, the shooting aim S returns to the original position before the start of the wobbling. The wobbling range Xmax1 and the wobbling time Tmax1 for the first wobbling movement are calculated in accordance with the current heart rate HR of the player. For example, a value (e.g., 4.0) in the case where the heart rate HR of the player represents the upper limit, and a value (e.g., 1.0) in the case where the heart rate HR of the player represents the lower limit, are previously provided for the wobbling range Xmax1 for the first wobbling movement, and the wobbling range Xmax1 is calculated by performing linear interpolation of the current heart rate HR. Further, a value (e.g., 1.0) in the case where the heart rate HR of the player represents the upper limit, and a value (e.g., 0.7) in the case where the heart rate HR of the player represents the lower limit, are previously provided also for the wobbling time Tmax1 for the first wobbling movement, and the wobbling time Tmax1 is calculated by performing linear interpolation of the current heart rate HR. Here, the values set at step 68 (i.e., the upper limit and the lower limit indicated by the heart rate upper limit data Dd and the heart rate lower limit data De, respectively) are used as the upper limit and the lower limit, and the latest heart rate HR stored in the heart rate data Db is used as the current heart rate HR. For each of the wobbling range Xmax1 and the wobbling time Tmax1, the value corresponding to the upper limit is set when the current heart rate HR exceeds the upper limit, and the value corresponding to the lower limit is set when the current heart rate HR is less than the lower limit. Further, as the wobbling direction Dl for the first wobbling movement, a value is randomly selected from the range between 0 and 2π (π is the circular constant, and this is the same in the following description).

The second wobbling movement is a wobbling movement such that, when the wobbling of the shooting aim S stops, the shooting aim S returns to a position that is different from the original position before the start of the wobbling. The wobbling time Tmax2 for the second wobbling movement is calculated in accordance with the current heart rate HR of the player. For example, a value (e.g., 1.0) in the case where the heart rate HR of the player represents the upper limit, and a value (e.g., 0.7) in the case where the heart rate HR of the player represents the lower limit, are previously provided also for the wobbling time Tmax2 for the second wobbling movement, and the wobbling time Tmax2 is calculated by performing linear interpolation of the current heart rate HR. The values set at step 68 (i.e., the upper limit and the lower limit indicated by the heart rate upper limit data Dd and the heart rate lower limit data De, respectively) are used as the upper limit and the lower limit, and the latest heart rate HR stored in the heart rate data Db is used as the current heart rate HR. For the wobbling time Tmax2, the value corresponding to the upper limit is set when the current heart rate HR exceeds the upper limit, and the value corresponding to the lower limit is set when the current heart rate HR is less than the lower limit. Thus, the wobbling time Tmax2 for the second wobbling movement and the wobbling time Tmax1 for the first wobbling movement are typically the same, but may be different from each other. As the wobbling range Xmax2 for the second wobbling movement, a value is randomly selected from the range between 0 and a predetermined value (e.g., 3.0). Further, as the wobbling direction D2 for the second wobbling movement, a value is randomly selected from the range between 0 and 2π.

Next, the CPU 10 initializes the elapsed time T and updates the elapsed time data Dj (step 84), and ends the processing of this subroutine. As described above, in this embodiment, the shooting aim S is moved so as to wobble by combining the first wobbling movement and the second wobbling movement. Thus, at step 84, elapsed times T1 and T2 corresponding to the first and second wobbling movements, respectively, are initialized (e.g., both are initialized to be 0). Here, when the wobbling time Tmax1 for the first wobbling movement and the wobbling time Tmax2 for the second wobbling movement are always set so as to be the same, only one elapsed time T may be handled at step 84 and in processing described below.

Referring back to FIG. 15, after the wobbling process initial setting at step 49, the CPU 10 performs a wobbling process (step 50) and proceeds the processing to the next step 52. With reference to FIG. 18, the following will describe the wobbling process performed at step 50.

In FIG. 18, the CPU 10 determines whether or not the elapsed time T is less than the wobbling time Tmax (step 92). For example, the CPU 10 refers to: the elapsed times T1 and T2 indicated by the elapsed time data Dj; and the wobbling times Tmax1 and Tmax2 indicated by the wobbling time data Dh, and determines whether or not Tmax1>T1 or Tmax2>T2, When Tmax1>T1 or Tmax2>T2 (i.e., when only the elapsed time T1 has not reached the wobbling time Tmax1, or when only the elapsed time T2 has not reached the wobbling time Tmax2, or when the elapsed time T1 has not reached the wobbling time Tmax1 and the elapsed time T2 also has not reached the wobbling time Tmax2), the CPU 10 proceeds the processing to the next step 93. On the other hand, when Tmax1≤T1 and Tmax2≤T2 (i.e., when the elapsed time T1 has reached the wobbling time Tmax1 and the elapsed time T also has reached the wobbling time Tmax2), the CPU 10 proceeds the processing to the next step 103.

At step 93, the CPU 10 determines whether or not the player has performed a discharge operation. For example, when the operation information obtained at step 43 indicates a discharge operation (e.g., an operation of pressing the A button 72d or the B button 72i) the CPU 10 determines that the player has performed the discharge operation. When the discharge operation has not been performed, the CPU 10 proceeds the processing to the next step 94. On the other hand, when the discharge operation has been performed, the CPU 10 proceeds the processing to the next step 102.

At step 94, the CPU 10 calculates a designated position corresponding to an operation of the player, and proceeds the processing to the next step. The method of calculating the designated position at step 94 is the same as that at the above step 47, and thus the detailed description thereof is omitted.

Next, the CPU 10 updates the elapsed time T (step 95) and proceeds the processing to the next step. For example, the CPU 10 adds a predetermined value (e.g., a value corresponding to an elapsed time from the immediately preceding processing) to each of the elapsed times T1 and T2 indicated by the elapsed time data Dj, and updates the elapsed time data Dj with the elapsed times T1 and T2 after the addition.

Next, the CPU 10 calculates the current first wobbling range X1 (step 96) and proceeds the processing to the next step. For example, the CPU 10 refers to the wobbling range data Dg, the wobbling time data Dh, and the elapsed time data Dj, and calculates the current first wobbling range X1 as follows.

$$X1 = X\max1 * \cos(T1/T\max1 * \pi * 4) * (T\max1 - T1)^2 / T\max1^2$$

Then, the CPU 10 updates the current first wobbling range data Dl with the calculated first wobbling range X1.

Next, the CPU 10 calculates the first offset value of1 (step 97) and proceeds the processing to the next step. For example, the CPU 10 refers to the wobbling direction data Di and the current first wobbling range data Dl, and calculates the first offset value of1 as follows.

$$of1x = X1 * \cos(D1)$$

$$of1y = X1 * \sin(D1)$$

Here, of1$x$ is a component of the first offset value of1 in an x-axis direction (horizontal direction), and of1$y$ is a component of the first offset value of1 in a y-axis direction (vertical direction). Then, the CPU 10 updates the first offset value data Dn with the calculated first offset value oil. As described in detail later, the first offset value of1 is a value added as an amount for changing the position of the shooting aim S arranged on the basis of the designated position. On the basis of the first offset value of1, the displayed position of the shooting aim S wobbles about the position of the shooting aims arranged on the basis of the designated position, such that the wobbling range Xmax 1 is reduced in a cosine wave manner.

Next, the CPU 10 calculates the current second wobbling range X2 (step 98) and proceeds the processing to the next step. For example, the CPU 10 refers to the wobbling range data Dg, the wobbling time data Dh, and the elapsed time data Dj, and calculates the current second wobbling range X2 as follows.

$$X2 = X\max2 * (1 - \cos(\pi * T2/T\max2))/2$$

Then, the CPU 10 updates the current second wobbling range data Dm with the calculated second wobbling range X2.

Next, the CPU 10 calculates the second offset value of2 (step 99) and proceeds the processing to the next step. For example, the CPU 10 refers to the wobbling direction data Di, the current second wobbling range data Dm, and the first offset value data Dn, and calculates the second offset value of2 as follows.

$$of2x = X2 * \cos(D2)$$

$$of2y = X2 * \sin(D2)$$

Here, of2$x$ is a component of the second offset value of2 in the x-axis direction (horizontal direction), and of2$y$ is a component of the second offset value of2 in the y-axis direction (vertical direction). Then, the CPU 10 updates the second offset value data Do with the calculated second offset value of2. Through the process at step 99, the second offset value of2 is obtained by adding the second wobbling range X2 that gradually increases from 0 to Xmax2 in response to an increase of the elapsed time T2, to the first offset value of1 in a random direction (wobbling direction D2). In other words, on the basis of the second offset value of2, the displayed position of the shooting aim S wobbles about the position of the shooting aim S arranged on the basis of the designated position, such that the wobbling range Xmax1 is reduced in a cosine wave manner, and the center of the wobbling is shifted in a random direction.

Next, the CPU 10 calculates an aim position on the basis of the designated position of the player and the second offset value of2 (step 100) and proceeds the processing to the next step. For example, the CPU 10 adds the second offset value of2 indicated by the second offset value data Do, to the designated position indicated by the designated position data Dk. Then, the CPU 10 calculates an aim position corresponding to the designated position obtained by the addition of the second offset value of2, and updates the aim position data Dp with the calculated aim position. As one example, when the designated position is indicated as a position based on the coordinate system that is set for the display screen, the CPU 10 calculates, as an aim position, a position obtained by performing projective transformation (perspective transformation) of the designated position, which is obtained by the addition of the second offset value of2, into the virtual game world, and updates the aim position data Dp. As another example, when the designated position is indicated as a position based on the coordinate system that is set for the virtual game world, the CPU 10 uses, as an aim position, the designated position obtained by addition of the second offset value of2, and updates the aim position data Dp with the used aim position. Note that, when a three-dimensional coordinate system is set for the virtual game world and the designated position is indicated as a position based on the three-dimensional coordinate system, the second offset value of2$x$ may be added to a component of the designated position in a horizontal direction (e.g., in an x-axis direction) in the three-dimensional coordinate system, and the second offset value of2$y$ may be added to a component of the designated position in a vertical direction (e.g., in a y-axis direction) in the three-dimensional coordinate system.

Next, the CPU 10 arranges the shooting aim S at a position corresponding to the designated position (e.g., at the designated position or the aim position) and displays the shooting aim S together with the virtual game world on the monitor 2 (step 101), and ends the processing of this subroutine. For example, the CPU 10 arranges the shooting aim S at the designated position based on the coordinate system that is set for the display screen or at the aim position based on the coordinate system that is set for the virtual game world, and displays the shooting aim S together with the virtual game world on the monitor 2.

On the other hand, when it is determined at the above step 92 that Tmax1≤T1 and Tmax2≤T2 (i.e., when it is determined that the elapsed time T1 has reached the wobbling time Tmax1 and the elapsed time T2 also has reached the wobbling time Tmax2), the CPU 10 sets the wobbling flag to be OFF and updates the wobbling flag data Df (step 103), and proceeds the processing to the above step 46 (FIG. 15).

Further, when it is determined at the above step 93 that the player has performed the discharge operation, the CPU 10 sets the wobbling flag to be OFF and updates the wobbling flag data Df (step 102), and proceeds the processing to the next step 51 (FIG. 15).

Referring back to FIG. 15, when it is determined at the above step 46 that the current moment is during the discharge operation, or when it is determined at the above step 93 that the player has performed the discharge operation, the CPU 10 causes the arrow object A to fly in accordance with the aim position (step 51), and proceeds the processing to the next step 52. For example, at step 51, the CPU 10 updates the position indicated by the arrow object position data Dq such that the arrow object A flies in the virtual game world at a predetermined speed toward the aim position indicated by the aim position data Dp from the position at which the player character PC sets the arrow object A on the bow, until colliding against another object. Then, the CPU 10 displays the arrow object A on the monitor 2 such that the arrow object A is arranged in the virtual game world in accordance with the updated position. In the process at step 51 (the process during the discharge operation), the shooting aim S may be kept displayed on the monitor 2, or the shooting aim S may be caused not to be displayed, in response to the discharge operation of the player.

At step 52, the CPU 10 performs the other game processes and proceeds the processing to the next step. For example, at step 52, the CPU 10 displays the player character PC on the monitor 2 such that the player character PC performs a motion corresponding to an operation of the player. Further, when the arrow object A hits the target object T, the CPU 10 extracts a score corresponding to the hit position, and displays the score on the monitor 2. Moreover, the CPU 10 performs processes for other objects arranged in the virtual game world.

Next, the CPU 10 determines whether or not to end the game (step 53). The game is to be ended, for example, when conditions to make the game over are satisfied, or when the player has performed an operation for ending the game. When not ending the game, the CPU 10 returns to the above step 43 to repeat the processing. On the other hand, when ending the game, the CPU 10 ends the processing of the flowchart.

As described above, according to the above game processing, the position of the shooting aim S that is a destination toward which the arrow object A is to fly, is determined in accordance with not only an operation of the player designating a position but also the biological signal of the player. Thus, a highly entertaining operation whose result cannot be easily anticipated by the player is possible. Further, the wobbling range and the wobbling time of the shooting aim S that wobbles in accordance with the biological signal are set on the basis of the heart rate HR of the player, and the wobbling direction of the shooting aim S is also randomly set. Thus, a more highly entertaining operation whose result cannot be easily anticipated by the player is possible.

In the above game example, the archery game is used in which the player character PC takes aim at the target object T and discharges (releases) the arrow object A in the virtual game world. However, it should be understood that the present invention is also applicable to other games. For example, the present invention is applicable to so-called shooting games in which a discharge object is discharged with an aim set in a virtual game world, being a destination.

Here, in the above example, the arrow object A is used as one example of the above discharge object. However, the "discharge object" may not be an object representing an arrow, and, for example, may be a bullet, a shell, a bomb, a hand grenade, a rocket, a missile, a ball, a beam, a laser beam, or the like in the virtual game world. Further, the present invention is applicable to games in which a discharge object is discharged toward an invisible object that is not displayed on the monitor 2 according to setting of the game.

Further, in the above game, a target (target object T) toward which the discharge object (arrow object A) should be discharged is fixed in the virtual game world. However, the present invention is also applicable to games in which a target moves. For example, the present invention is applicable to games in which an object moveable in a virtual game world (e.g., an enemy object) is arranged as a target for a discharge object and the object is shot using a shooting aim. In this case, the present invention is applicable to games in which an object that is a target moves so as to approach a player character in a virtual game world and the game is made over when the object gets close to the player character within a predetermined distance.

Further, in the above game processing, during the discharge operation (in a state that the player has performed the discharge operation, or during the period from the time when the arrow object A is released from the bow and to the time when the next arrow object A is set on the bow again), the position of the shooting aim S is fixed at the position that is at the immediately preceding discharge operation. However, even during the discharge operation, the position of the shooting aim S may be moveable. In this case, even when a discharge object is flying in the virtual game world, the player is allowed to change a flying destination for the discharge object by performing an operation of the operation section 72 (e.g., the cross key 72a), and the flying destination is also changed on the basis of the biological signal of the player. Thus, a more highly entertaining operation is possible.

Further, in the above description, the present invention is applied to the game in which the discharge object is discharged in the virtual game world with a set shooting aim being a destination. However, the present invention is also applicable to other games. For example, the present invention is applicable to games in which a designated position in a virtual game world is set in accordance with an operation of a player and a process is performed using the designated position. As an example, the present invention is applicable to games in which a motion is performed with respect to a game object that is arranged in a virtual game world at a position corresponding to a designated position that is set in accordance with an operation of a player or at a position corresponding to the vicinity of the designated position, for example, the game object at the position corresponding to the designated position is grasped or moved by using a object (e.g., a player object, an icon, a cursor, or the like) that can be operated by the player. As another example, the present invention is applicable to games in which a player character is moved in a virtual game world to a position corresponding to a designated position that is set in accordance with an operation of a player. Even in such games, the position in the virtual game world corresponding to the designated position that is set by the player is changed on the basis of the biological signal of the player. Thus, a result of the above operation or of an operation for movement cannot be easily anticipated by the player, and a highly entertaining operation is possible.

Further, in the above game processing, the designated position (position of the shooting aim S) that is set by the player is changeable in accordance with a direction designated by pressing the cross key 72*a*. However, the designated position may be set by using another input device. For example, the designated position may be moved by using data outputted from a sensor that is fixed to the core unit 70. Specifically, a sensor (the acceleration sensor 701 or a tilt sensor) that outputs data corresponding to a tilt of the core unit 70 (hereinafter referred to merely as "tilt") with respect to the direction of gravity, a sensor (magnetic sensor) that outputs data corresponding to the orientation of the core unit 70, a sensor (gyro-sensor) that outputs data corresponding to a rotation of the core unit 70, or the like, is provided to the core unit 70, and the data outputted from the sensor can be used. In this case, the designated position (position of the shooting aim S) may be moved in accordance with a movement or a tilt of the core unit 70 that can be determined by using the data.

Further, the designated position that is set by the player may be changeable in accordance with a pointing position designated by using a pointing device. Here, the pointing device serves to designate an input position or a coordinate on the screen. For example, a touch panel, a mouse, a trackpad, a trackball, or the like, may be used as the input device, and the designated position may be set by using positional information of a screen coordinate system that is calculated on the basis of an output value outputted from the input device.

As described above, the imaging information calculation section 74 fixed in the core unit 70 can be used as the pointing device. In this case, an image taken by the imaging information calculation section 74 is changed in accordance with a change of a position designated by the housing 71 of the core unit 70. Thus, by analyzing the taken image, a coordinate (designated by the housing 71 with respect to the display screen can be calculated as the designated position. Here, in an embodiment in which the imaging information calculation section 74 is used as the pointing device, in order to remotely designate a coordinate on the display screen, a designated position on the display screen of the monitor 2 is designated by analyzing image data obtained by taking an image of an imaging target by the image pickup element 743 that is provided in the core unit 70. In this embodiment, two makers that are imaging targets are set in the vicinity of the display screen, a device that has imaging means and a housing that allows the imaging direction of the imaging means to be freely changed detects the two markers in a taken image, and a coordinate position designated by the device is obtained on the basis of the positions of the markers in the taken image. However, the coordinate designation may be performed in other manners.

For example, other than the above electric markers (the LED module), an imaging target that is provided in the vicinity of the display screen may be a member that reflects light or a physical marker that has a specific color or a specific shape. Alternatively, an imaging target may be displayed on the display screen of the monitor 2. Still alternatively, an imaging target may be a raster scan type monitor having scan lines that are read by the imaging means of the core unit 70. Still alternatively, a magnetic field generating apparatus may be provided, and a magnetic field generated by the magnetic field generating apparatus may be used for remotely designating a coordinate position. In this case, the core unit 70 is provided with a magnetic sensor for detecting the magnetic field.

Further, in the above description, the infrared lights from the two markers 8L and 8R are imaging targets of the imaging information calculation section 74 of the core unit 70, but another element may be an imaging target. For example, one marker or three or more markers may be provided in the vicinity of the monitor 2, and infrared lights from these markers may be imaging targets of the imaging information calculation section 74. For example, even when a single marker having a predetermined length is provided in the vicinity of the monitor 2, the present invention can be similarly implemented. Alternatively, the display screen itself of the monitor 2 or another light emitter (an interior light or the like) may be an imaging target of the imaging information calculation section 74. When a position of the core unit 70 with respect to the display screen is calculated on the basis of an arrangement relation between an imaging target and the display screen of the monitor 2, various light emitters can be used as imaging targets of the imaging information calculation section 74.

An imaging target such as a marker may be provided on the core unit 70, and imaging means may be provided on the monitor 2. In a still another example, a mechanism for emitting light from the front surface of the core unit 70 may be provided. In this case, by: providing an imaging device for taking an image of the display screen of the monitor 2, at a place different from those of the core unit 70 and the monitor 2; and analyzing, on the basis of an image taken by the imaging device, a position at which light emitted from the core unit 70 toward the display screen of the monitor 2 is reflected, it is similarly possible to configure a pointing device that is capable of outputting data for remotely designating a coordinate position with respect to the display screen.

Further, when the sensor for designating the designated position may be provided independently outside the core unit 70, it is not necessary to use the core unit 70. For example, an image of the player is taken by a camera functioning as the sensor, and the image of the player in the taken image is analyzed, whereby a motion or a posture of the player is identified, and the shooting aim S is moved in accordance with the identification result. Alternatively, by using a sensor that is provided to an input device operated by a player standing thereon (e.g., a board type controller) and detects a weight applied to the input device or any object placed on the input device, a motion or a posture of the player operating the input device is identified, whereby the shooting aim S is moved in accordance with the identification result. When any of the sensors of the above-described types is used to move the shooting aim S, the core unit 70 need not be used.

Further, in the above example of the game processing, the shooting aim S is moved so as to wobble by combining the two wobbling movements (the first wobbling movement and the second wobbling movement). However, the manner of wobbling the shooting aim S is not limited thereto. For example, the shooting aim S may be moved so as to wobble by using only one of the first wobbling movement and the second wobbling movement.

For example, in the case where, when the wobbling of the shooting aim S stops, the shooting aim S returns to a position that is different from the original position before the start of the wobbling, the designated position may be deviated when the wobbling movement stops, with an operation of designating a designated position on the screen directly by a pointing position (e.g., with a pointing operation using a touch panel or the imaging information calculation section 74). Thus, in the case of moving the shooting aim S with such an operation, a manner of wobbling the shooting aim S by using only the first wobbling movement (the wobbling movement in which, when the wobbling of the shooting aim S stops, the shooting aim S returns to the original position before the start of the wobbling) is considered to reduce an uncomfortable feeling of an operation.

Further, in the case of wobbling the shooting aim S by using only the second wobbling movement, the position of the shooting aim S is changed such that the second wobbling range X2 that gradually increases from 0 to Xmax2 over time is offset in a random direction. Thus, when the position of the shooting aim S is changed by using only the second wobbling movement, technically, the shooting aim S is not displayed so as to wobble, but its displayed position is moved so as to deviate in a random direction. However, in the present invention, it is only necessary to set the displayed position of the shooting aim S with respect to the virtual game world in accordance with an operation of the player, and to change the displayed position in accordance with the biological signal of the player. Thus, the displayed position may be changed so as to merely deviate, not to wobble.

Further, the position of the shooting aim S may be changed by using at least one of the first wobbling movement and the second wobbling movement. Specifically, when the wobbling range Xmax2 for the second wobbling movement is set to be 0 at the above step 83, the shooting aim S wobbles by using only the first wobbling movement accordingly. As described above, adjustment of setting criterion for the set values for wobbling at step 83 allows the position of the shooting aim S to be changed by using at least one of the first wobbling movement and the second wobbling movement.

Further, in the above description, the wobbling range Xmax, the wobbling time Tmax, and the like, for the wobbling movement the shooting aim S are set on the basis of the heart rate HR of the player. However, each parameter for the wobbling movement may be set on the basis of another parameter obtained from the player. For example, each parameter for the wobbling movement may be set on the basis of at least one parameter selected from a pulse wave, a sympathetic nerve activity, a parasympathetic nerve activity, a coefficient of variance of the heartbeat, an interval of heartbeats, a respiratory cycle, an amplitude of the pulse wave, and the like, which are obtained from the player. Further, in the above description, an operation for wobbling the position of the shooting aim S is temporarily performed at each pulse timing of the player. However, the operation for wobbling the position of the shooting aim S is temporarily performed at every cycle of another cyclic parameter obtained from the player (e.g., the respiratory cycle).

Further, in the above description, a site of the player's body (e.g., a finger tip) is irradiated with infrared light, and a biological signal (pulse wave signal) of the player is obtained on the basis of the amount of infrared light that is transmitted and received through the site of the body. That is, a change in volume of blood vessels is detected by a so-called optical method to obtain a volume pulse wave. Alternatively, in the present embodiment, the biological signal of the player may be obtained by using sensors of other types that obtain physiological information that occurs when the player performs physical activities. For example, the biological signal of the player may be obtained by detecting a change in pressure in blood vessels which is cause by pulsation of the arterial system, to obtain a pressure pulse wave as the biological signal of the player (e.g., by a piezoelectric method). Alternatively, a muscle potential or a heart potential of the player may be obtained as the biological signal of the player. The muscle potential or the heart potential can be detected by a commonly used method in which electrodes are used. For example, on the basis of a minute change in current in the player's body, the biological signal of the player can be obtained. Alternatively, a blood flow of the player may be obtained as the biological signal of the player. The blood flow is measured as a pulsating blood flow per heartbeat by using an electromagnetic method, an ultrasound method, or the like, whereby the pulsating blood flow is obtained as the biological signal of the player. A vital sensor may be attached to a site (e.g., a chest, an arm, an ear lobe, etc.) other than a finger of the player in order to obtain various biological signals described above. Strictly speaking, there may be a difference between the pulse and the heartbeat depending on the obtained biological signal. However, a heart rate and a pulse rate are considered to be substantially equal to each other, and thus the obtained biological signal can be processed in a manner similar to that of the aforementioned processing.

Further, in the above description, the vital sensor 76 transmits data indicative of a pulse wave signal, to the game apparatus body 5 in which various parameters are calculated from the pulse wave signal. Alternatively, data at other process steps may be transmitted to the game apparatus body 5. For example, the vital sensor 76 may calculate any of parameters indicative of: detection of the pulse timing; the interval of pulse timings (interval of heartbeats); the heart rate HR; the pulse wave amplitude PA; and the pulse wave area PWA, and transmit data indicative of the parameters, to the game apparatus body 5. Alternatively, data halfway through calculation of the parameters from the pulse wave signal may be transmitted from the vital sensor 76 to the game apparatus body 5.

Further, in the above description, the game processing is performed by using the controller 7 (the vital sensor 76 and the core unit 70) and the game apparatus body 5 (i.e., the game apparatus 3). Alternatively, at least some of the process steps in the above game processing may be performed by using another apparatus. For example, when the game apparatus 3 is configured to be communicable with another apparatus (e.g., a server and another game apparatus), the process steps in the game processing may be performed by using the game apparatus 3 and the other apparatus in a cooperative manner. For example, when a virtual game world is set by the other apparatus, a case is considered where: a pulse wave signal outputted from the vital sensor 76 and key data outputted from the core unit 70 are transmitted to the other apparatus; the game processing thereafter is performed on the other apparatus; and then a display process is performed on the game apparatus 3. In another example, when a virtual game world is set by the other apparatus, a case is considered where: data halfway through the game processing (e.g., data indicative of the interval of pulse timings (such as the heart rate HR), data indicative of the aim position, and data indicative of the discharge operation) is transmitted from the game apparatus 3 to the other apparatus; the process using the transmitted data is performed on the other apparatus; and then a display process is performed on the game apparatus 3. In this manner, by performing at least some of the process steps in the game processing on the other apparatus, processing similar to the game processing described above can be realized. In addition, the present embodiment is applicable to game processing that allows a plurality of players playing with individual game apparatuses to join a virtual game world realized on another apparatus (e.g., an on-line game that is operated on another apparatus and is joined and shared by a plurality of players playing with individual game apparatuses). The above game processing can be performed by one processor included in an information processing system that includes at least one information processing apparatus, or by multiple processors in the information processing system in a cooperative manner.

Further, the present embodiment is applied to the stationary game apparatus 3. The present embodiment is also applicable to any apparatus that includes at least a vital sensor, an input device to which operations are inputted by a player, and an information processing device for performing a process depending on information obtained from the sensor and the device. For example, the present embodiment is applicable to a commonly used personal computer, a mobile phone, a personal digital assistant (PDA), a hand-held game apparatus, and the like.

Further, in the above description, the core unit 70 and the game apparatus body 5 are connected to each other by wireless communication. Alternatively, the core unit 70 and the game apparatus body 5 may be electrically connected to each other via a cable. In this case, a cable connected to the core unit 70 is connected to a connection terminal of the game apparatus body 5.

Further, of the core unit 70 and the vital sensor 76 constituting the controller 7, only the core unit 70 is provided with the communication section 75. Alternatively, the vital sensor 76 may be provided with the communication section that wirelessly transmits biological information data to the game apparatus body 5. Alternatively, each of the core unit 70 and the vital sensor 76 may be provided with the communication section. For example, the communication sections provided in the core unit 70 and the vital sensor 76 may each wirelessly transmit biological information data or operation data to the game apparatus body 5. Alternatively, the communication section of the vital sensor 76 may wirelessly transmit biological information data to the core unit 70, and the communication section 75 of the core unit 70 may receive it. And thereafter, the communication section 75 of the core unit 70 may wirelessly transmit, to the game apparatus body 5, operation data of the core unit 70 along with the biological information, data of the vital sensor 76. In these cases, the connection cable 79 for electrically connecting the core unit 70 to the vital sensor 76 is no longer required.

Further, the shape of the above core unit 70, and the shape, number, and arrangement or the like of the operation section 72 arranged thereon, are merely one example. The present invention can be achieved with other shapes, numbers, arrangements, and the like. Further, the shape of the above vital sensor 76, and the types, numbers, arrangements, and the like of the components provided therein, are also merely one example. The present embodiment can be achieved with other types, numbers, arrangements, and the like. Further, the coefficients, criteria, mathematical formulas, processing orders, and the like which are used in the above-described processing, are also merely one example. The present embodiment can be achieved with other values, mathematical formulas, and processing orders.

Further, the above game program may be supplied to the game apparatus body 5 not only from an external storage medium such as the optical disc 4, but also via a wireless or wired communication line. Further, the game program may be previously stored in a non-volatile storage device of the game apparatus body 5. Examples of the information storage medium having the game program stored thereon include a flexible disk, a hard disk, a magnetic optical disk, a magnetic tape, and a non-volatile memory in addition to a CD-ROM, a DVD, and any other optical disc-shaped storage medium similar to these media. Further, as the information storage medium storing thereon the game program, a volatile memory that stores the game program temporarily may be used.

While the present embodiment has been described in detail, the foregoing description is in all aspects illustrative and not restrictive. It is understood that numerous other modifications and variations can be devised without departing from the scope of the embodiment. It should be understood that the scope of the present embodiment is defined only by the appended claims. It is also understood that one skilled in the art can implement the present embodiment in the equivalent range based on the description of the present embodiment and common technical knowledge, from the description of the specific embodiments. Further, throughout the specification, it should be understood that terms in singular form include a concept of plurality. Thus, it should be understood that articles or adjectives indicating the singular form (e.g., "a", "an", "the", and the like in English) includes the concept of plurality unless otherwise specified. Further it should be understood that terms used in the present specification have meanings generally used in the art unless otherwise specified. Therefore, unless otherwise defined, all the jargons and technical terms have the same meanings as those generally understood by one skilled in the art of the present embodiment. In the event of any contradiction, the present specification (including meanings defined herein) has priority.

A storage medium having a game program stored thereon, a game apparatus, a game system, and a game processing method according to the present embodiment can realize a highly entertaining operation whose result cannot be easily anticipated by the player, and are useful as a game program, a game apparatus, a game system, a game processing method, and the like which perform game processing on the basis of a position designated by a player.

What is claimed is:

1. A non-transitory computer-readable storage medium having stored thereon a game program that is executed by a computer of a game apparatus that performs game processing on the basis of a designated position that is set in accordance with an operation performed by a player with respect to an input device, the game program causing the computer to perform:

operation input obtaining for obtaining an operation input performed by the player with respect to the input device;

designated position setting for setting a designated position with respect to a virtual game world in accordance with the operation input;

biological signal obtaining for obtaining a biological signal from the player;

designated position change for changing the designated position in accordance with the obtained biological signal; and game processing for performing a predetermined game process on the basis of the designated position, wherein the designated position change temporarily changes the designated position in accordance with the obtained biological signal, and wherein, when ending an operation for temporarily changing the designated position, the designated position change changes the designated position such that a designated position after the end of the operation becomes the designated position that is set by the designated position setting.

2. The non-transitory computer-readable storage medium according to claim 1, wherein
the game processing includes:
shooting aim display for setting a shooting aim in accordance with the designated position and for displaying the virtual game world in which the shooting aim is set, together with the shooting aim on a display device; and
discharge object discharge-display for discharging a discharge object in accordance with the operation input, with a position in the virtual game world which corresponds to a position of the shooting aim, being a destination, and for displaying the virtual game world in which the discharged discharge object is arranged, on the display device.

3. The non-transitory computer-readable storage medium according to claim 2, wherein
the shooting aim display changes a position of the shooting aim displayed on a display screen of the display device, in accordance with the designated position change changing the designated position, and displays the virtual game world in which the shooting aim is set, together with the shooting aim on the display device.

4. The non-transitory computer-readable storage medium according to claim 2, wherein
the shooting aim display changes a range of the virtual game world displayed on a display screen of the display device, in accordance with the designated position change changing the designated position, and displays the virtual game world in which the shooting aim is set, together with the shooting aim on the display device.

5. The non-transitory computer-readable storage medium according to claim 1, wherein
the biological signal obtaining obtains a cyclic biological signal from the player, and
the designated position change changes the designated position at every cycle of the cyclic biological signal.

6. The non-transitory computer-readable storage medium according to claim 5, wherein
the designated position change starts an operation for wobbling the designated position at every cycle of the cyclic biological signal, and changes the designated position such that a wobbling range of the designated position is reduced over time.

7. The non-transitory computer-readable storage medium according to claim 5, wherein
the game program further causes the computer to perform pulse timing detection for detecting, on the basis of the cyclic biological signal obtained by the biological signal obtaining, a pulse timing in pulse or heartbeat of the player, and
the designated position change changes the designated position from the pulse timing detected by the pulse timing detection.

8. The non-transitory computer-readable storage medium according to claim 7, wherein
the biological signal obtaining obtains, as the cyclic biological signal, a signal relating to a pulse wave or the heartbeat of the player, and
the pulse timing detection detects, as the pulse timing, a timing at which the signal relating to the pulse wave or the heartbeat, which signal is obtained by the biological signal obtaining, represents a local minimum value or a local maximum value.

9. The non-transitory computer-readable storage medium according to claim 7, wherein
the biological signal obtaining obtains, as the cyclic biological signal, a signal relating to a pulse wave or the heartbeat of the player, and
the pulse timing detection detects, as the pulse timing, a timing at which a contraction rate or an expansion rate of blood vessels reaches a maximum value in the signal relating to the pulse wave or the heartbeat, which signal is obtained by the biological signal obtaining.

10. The non-transitory computer-readable storage medium according to claim 7, wherein
the biological signal obtaining obtains, as the cyclic biological signal, a signal relating to a pulse wave or the heartbeat of the player, and
the pulse timing detection detects, as the pulse timing, a timing at which contraction acceleration or expansion acceleration of blood vessels reaches a maximum value in the signal relating to the pulse wave or the heartbeat, which signal is obtained by the biological signal obtaining.

11. The non-transitory computer-readable storage medium according to claim 1, wherein
the game program further causes the computer to perform pulse timing detection for detecting, on the basis of the obtained biological signal, a pulse timing in pulse or heartbeat of the player, and
the designated position change temporarily changes the designated position from the pulse timing detected by the pulse timing detection to a time when a predetermined time period elapses.

12. The non-transitory computer-readable storage medium according to claim 1, wherein,
when ending an operation for temporarily changing the designated position, the designated position setting sets a designated position of the designated position setting by using a designated position that is at a time when the designated position change ends the operation.

13. The non-transitory computer-readable storage medium according to claim 12, wherein
the game program further causes the computer to perform pulse timing detection for detecting, on the basis of the obtained biological signal, a pulse timing in pulse or heartbeat of the player, and
the designated position change temporarily changes the designated position from the pulse timing detected by the pulse timing detection to a time when a predetermined time period elapses.

14. The non-transitory computer-readable storage medium according to claim 1, wherein
the designated position change sets at least one of:
a change amount by which the designated position is to be changed; and
a period for which the designated position is to be changed, in accordance with the obtained biological signal, and changes the designated position on the basis of at least one of the change amount and the period.

15. The non-transitory computer-readable storage medium according to claim 14, wherein
the biological signal obtaining obtains, as the biological signal, at least one member that is selected from the group consisting of a pulse wave, a heartbeat, a sympathetic nerve activity, a parasympathetic nerve activity, a coefficient of variance of heartbeat, an interval of heartbeats, a respiratory cycle, an amplitude of the pulse wave, of the player, and
the designated position change sets at least one of:

the change amount by which the designated position is to be changed; and the period for which the designated position is to be changed, in accordance with the at least one member that is selected from the group and obtained by the biological signal obtaining.

16. The non-transitory computer-readable storage medium according to claim 15, wherein the designated position change sets the change amount by which the designated position is to be changed, to be larger when an amplitude of a waveform of pulse or heartbeat of the player is greater, which waveform is calculated on the basis of the at least one member selected from the group.

17. A game apparatus that performs game processing on the basis of a designated position that is set in accordance with an operation performed by a player with respect to an input device, the game apparatus comprising a computer configured to perform:

operation input obtaining for obtaining an operation input performed by the player with respect to the input device;

designated position setting for setting a designated position with respect to a virtual game world in accordance with the operation input;

biological signal obtaining for obtaining a biological signal from the player;

designated position change for changing the designated position in accordance with the obtained biological signal; and game processing for performing a predetermined game process on the basis of the designated position, wherein the designated position change temporarily changes the designated position in accordance with the obtained biological signal, and wherein, when ending an operation for temporarily changing the designated position, the designated position change changes the designated position such that a designated position after the end of the operation becomes the designated position that is set by the designated position setting.

18. A game system that includes a plurality of apparatuses communicable with each other and performs game processing on the basis of a designated position that is set in accordance with an operation performed by a player with respect to an input device, the game system comprising a computer configured to perform:

operation input obtaining for obtaining an operation input performed by the player with respect to the input device;

designated position setting for setting a designated position with respect to a virtual game world in accordance with the operation input;

biological signal obtaining for obtaining a biological signal from the player;

designated position change for changing the designated position in accordance with the obtained biological signal; and game processing for performing a predetermined game process on the basis of the designated position, wherein the designated position change temporarily changes the designated position in accordance with the obtained biological signal, and wherein, when ending an operation for temporarily changing the designated position, the designated position change changes the designated position such that a designated position after the end of the operation becomes the designated position that is set by the designated position setting.

19. A game processing method that is executed by one processor included in an information processing system that includes at least one information processing apparatus, or by multiple processors in the information processing system in a cooperative manner, the game processing method comprising:

obtaining an operation input performed by the player with respect to the input device;

setting a designated position with respect to a virtual game world in accordance with the operation input;

obtaining a biological signal from the player;

changing the designated position in accordance with the obtained biological signal; and performing a predetermined game process on the basis of the designated position, wherein the designated position changing temporarily changes the designated position in accordance with the obtained biological signal, and wherein, when ending an operation for temporarily changing the designated position, the designated position changing changes the designated position such that a designated position after the end of the operation becomes the designated position that is set by the designated position setting.

* * * * *